(12) United States Patent
Kaneko

(10) Patent No.: US 12,069,224 B2
(45) Date of Patent: Aug. 20, 2024

(54) IMAGE DISPLAY APPARATUS, IMAGE DISPLAY METHOD, AND IMAGE DISPLAY PROGRAM

(71) Applicant: FUJIFILM Corporation, Tokyo (JP)

(72) Inventor: Yasuhiko Kaneko, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 276 days.

(21) Appl. No.: 17/574,788

(22) Filed: Jan. 13, 2022

(65) Prior Publication Data
US 2022/0141441 A1 May 5, 2022

Related U.S. Application Data

(63) Continuation of application No. PCT/JP2020/021907, filed on Jun. 3, 2020.

(30) Foreign Application Priority Data

Jul. 19, 2019 (JP) ................. 2019-133949

(51) Int. Cl.
*H04N 13/117* (2018.01)
*G06T 19/00* (2011.01)

(52) U.S. Cl.
CPC ......... *H04N 13/117* (2018.05); *G06T 19/003* (2013.01); *G06T 2200/04* (2013.01); *G06T 2200/08* (2013.01)

(58) Field of Classification Search
None
See application file for complete search history.

(56) References Cited

U.S. PATENT DOCUMENTS

| 2015/0189144 A1* | 7/2015 | Yoshii ................ H04N 13/239 348/46 |
| 2015/0269785 A1 | 9/2015 | Bell et al. |

(Continued)

FOREIGN PATENT DOCUMENTS

| JP | 2006-309722 A | 11/2006 |
| JP | 2017-130146 A | 7/2017 |

(Continued)

OTHER PUBLICATIONS

An Office Action; "Notice of Reasons for Refusal," mailed by the Japanese Patent Office on Apr. 5, 2023, which corresponds to Japanese Patent Application No. 2021-534579 and is related to U.S. Appl. No. 17/574,788; with English language translation.

(Continued)

*Primary Examiner* — Mohammad J Rahman
(74) *Attorney, Agent, or Firm* — Studebaker & Brackett PC

(57) ABSTRACT

When a three-dimensional model of a photographic subject is displayed on a display, and a view operation for enlarging the three-dimensional model is performed, a desired position on the photographic subject can be easily specified. After a desired position on the photographic subject is specified, a three-dimensional position, on the three-dimensional model, corresponding to the position is identified, and a plurality of captured images each including a pixel corresponding to the identified three-dimensional position are retrieved from a group of captured images obtained by image capturing of the photographic subject. An optimum captured image is determined from among the plurality of retrieved captured images or the priority levels of the plurality of retrieved captured images are determined. The determined optimum captured image is displayed on the display or some or all of (Continued)

| THUMBNAIL | IMAGE FILE NAME | DEGREE OF FACING | DISTANCE [m] | RECORD | CRACK | POSITION | IMAGE CAPTURE DATE AND TIME |
|---|---|---|---|---|---|---|---|
| | ABC0001.png | 10° | 1.5 | | | | |
| | ABC0002.png | 9° | 1.7 | ✓ | ✓ | | |
| | ABC0003.png | 12° | 1.6 | | | | |
| | ABC1499.png | 5° | 2.0 | ✓ | | | |
| | ABC1500.png | 3° | 1.9 | ✓ | ✓ | | |

[IMAGE LIST]

the plurality of captured images are displayed on the display in accordance with the determined priority levels.

24 Claims, 14 Drawing Sheets

(56) References Cited

U.S. PATENT DOCUMENTS

| | | | | |
|---|---|---|---|---|
| 2018/0276330 | A1* | 9/2018 | Demizu | G06F 30/17 |
| 2019/0026955 | A1 | 1/2019 | Ogata et al. | |
| 2019/0043245 | A1* | 2/2019 | Ogata | G06T 19/00 |
| 2019/0246089 | A1* | 8/2019 | Maeda | G06T 15/205 |
| 2019/0268612 | A1* | 8/2019 | Fukuyasu | H04N 21/234 |
| 2020/0322591 | A1* | 10/2020 | Yano | H04N 23/90 |
| 2021/0287432 | A1* | 9/2021 | Katsumata | G06T 15/20 |

FOREIGN PATENT DOCUMENTS

| | | |
|---|---|---|
| JP | 2017-168077 A | 9/2017 |
| JP | 2018-084130 A | 5/2018 |

OTHER PUBLICATIONS

Paolo Brivio et al., "PhotoCloud: Interactive Remote Exploration of Joint 2D and 3D Datasets," IEEE Computer Graphics and Applications, vol. 33, No. 2, Mar. 1, 2013, pp. 86-96, IEEE Service Center, NY.

Noah Snavely et al., "Photo Tourism: Exploring Photo Collections in 3D," International Conference on Computer Graphics and Interactive Techniques, ACM SIGGRAPH 2006 Papers, Jul. 1, 2006, pp. 835-846, ACM, NY.

The extended European search report issued by the European Patent Office on Nov. 16, 2022, which corresponds to European U.S. Appl. No. 17/574,788—1207 and is related to U.S. Appl. No. 17/574,788.

An Office Action; "Decision of Refusal," mailed by the Japanese Patent Office on Sep. 20, 2023, which Corresponds to Japanese Patent Application No. 2021-534579 and is related to U.S. Appl. No. 17/574,788; with English language translation.

International Search Report issued in PCT/JP2020/021907; mailed Sep. 1, 2020.

International Preliminary Report on Patentability and Written Opinion issued in PCT/JP2020/021907; issued Jan. 25, 2022.

Kado, Keita et al., Photograph Management with 3D CAD and computer vision, AIJ Journal of Technology and Design, Architectural Institute of Japan, vol. 18, No. 39, pp. 781-784, Jun. 20, 2012.

* cited by examiner

[ORTHO-IMAGE]

[DAMAGE DIAGRAM]

[ORTHO-IMAGE + DAMAGE DIAGRAM]

FIG. 10

| DAMAGE ID | DAMAGE TYPE | SIZE (WIDTH mm) | SIZE (LENGTH mm) | SIZE (AREA $m^2$) |
|---|---|---|---|---|
| C1 | CRACK | 0.55 | 1800 | – |
| C2 | CRACK | 0.60 | 700 | – |
| C3 | CRACK | 0.30 | 2000 | – |
| C4 | CRACK | 0.25 | 1000 | – |
| C5 | CRACK | 0.10 | 1500 | – |
| H1 | PEELING | – | – | 0.85 |

[DAMAGE DATA TABLE]

| THUMBNAIL | IMAGE FILE NAME | DEGREE OF FACING | DISTANCE [m] | RECORD | CRACK | POSITION | IMAGE CAPTURE DATE AND TIME |
|---|---|---|---|---|---|---|---|
|  | ABC0001.png | 10° | 1.5 | | | | |
|  | ABC0002.png | 9° | 1.7 | ✓ | ✓ | | |
|  | ABC0003.png | 12° | 1.6 | | | | |
|  | ABC1499.png | 5° | 2.0 | ✓ | | | |
|  | ABC1500.png | 3° | 1.9 | ✓ | ✓ | | |

[IMAGE LIST]

IMAGE DISPLAY APPARATUS, IMAGE DISPLAY METHOD, AND IMAGE DISPLAY PROGRAM

CROSS-REFERENCE TO RELATED APPLICATIONS

This application is a Continuation of PCT International Application No. PCT/JP2020/021907 filed on Jun. 3, 2020, which claims priority under 35 U.S.C § 119(a) to Japanese Patent Application No. 2019-133949 filed on Jul. 19, 2019. Each of the above application(s) is hereby expressly incorporated by reference, in its entirety, into the present application.

BACKGROUND OF THE INVENTION

1. Field of the Invention

The present invention relates to an image display apparatus, an image display method, and an image display program and specifically relates to a technique for obtaining a desired captured image from a group of captured images obtained by image capturing of a photographic subject from different image capture positions and in different image capture directions relative to the photographic subject.

2. Description of the Related Art

Recently, an image management apparatus that can obtain images for each structural block of a construction at once from a large number of captured images of the construction has been proposed (JP2017-130146A).

The image management apparatus described in JP2017-130146A displays on a display unit a three-dimensional point cloud concerning a construction or a three-dimensional model formed of a mesh generated on the basis of the three-dimensional point cloud, and when the three-dimensional coordinates of a position on the construction is specified by a user using the displayed three-dimensional point cloud or the displayed three-dimensional model, extracts three-dimensional points corresponding to a segment that is a structural block in the construction from the three-dimensional point cloud on the basis of the specified three-dimensional coordinates. Here, the segment corresponds to an inspection target part of the construction and is, for example, a main girder or a floor slab in a case where the inspection target is a bridge.

The image management apparatus obtains images associated with the extracted three-dimensional points corresponding to the segment from an image storage unit that stores images of the construction, and displays the obtained images on the display unit.

SUMMARY OF THE INVENTION

The image management apparatus described in JP2017-130146A identifies the segment (in a case where the construction is a bridge, an inspection target part, such as a main girder or a floor slab) that is a structural block in the construction on the basis of the three-dimensional coordinates of the position on the construction specified by the user, and obtains and presents to the user, images associated with the segment. Accordingly, the user can view the captured images of the inspection target part at once; however, the images presented by the image management apparatus include an image that does not include the position (the three-dimensional coordinates of the position on the construction) specified by the user.

This is because the image management apparatus described in JP2017-130146A is an apparatus that, in a case where the user wants to view captured images of an inspection target part of the construction at once, obtains and presents to the user, target images (images of the inspection target part) from a large number of captured images of the construction.

That is, the image management apparatus described in JP2017-130146A does not obtain or present captured images that include the position specified by the user. The user specifies the three-dimensional coordinates of the position on the construction by using, for example, the three-dimensional point cloud displayed on the display unit; however, specification of the three-dimensional coordinates means specification of an inspection target part and does not mean specification of images each including a pixel of a three-dimensional point of the construction corresponding to the three-dimensional coordinates.

The present invention has been made in view of the above-described circumstances, and an object thereof is to provide an image display apparatus, an image display method, and an image display program with which an optimum captured image among a plurality of captured images each including a pixel of a desired three-dimensional point of a photographic subject, such as a construction, can be displayed or some or all of the plurality of captured images can be displayed in accordance with their priority levels.

To achieve the above-described object, an image display apparatus according to an aspect of the present invention includes: a storage unit that stores a three-dimensional model of a photographic subject and a group of captured images obtained by image capturing of the photographic subject from different image capture positions and in different image capture directions relative to the photographic subject; a first operation unit that, in a case where the three-dimensional model stored in the storage unit is to be displayed on a display unit, accepts a view operation for the three-dimensional model to be displayed on the display unit; a first display control unit that reads and displays on the display unit the three-dimensional model stored in the storage unit and displays the three-dimensional model on the basis of the view operation accepted by the first operation unit; a second operation unit that accepts, in accordance with a user operation, positional information indicating a position on the three-dimensional model displayed on the display unit; a captured-image retrieving unit that identifies a three-dimensional position on the three-dimensional model on the basis of the accepted positional information and retrieves a plurality of captured images each including a pixel corresponding to the identified three-dimensional position from the group of captured images stored in the storage unit; a captured-image determination unit that determines an optimum captured image from among the plurality of retrieved captured images or determines priority levels of the plurality of retrieved captured images; and a second display control unit that displays the optimum captured image determined by the captured-image determination unit on the display unit or displays some or all of the plurality of captured images on the display unit in accordance with the determined priority levels.

According to the aspect of the present invention, the three-dimensional model of the photographic subject is displayed on the display unit and the view operation for, for example, enlarging the three-dimensional model is performed. Accordingly, the user can easily specify a desired position on the photographic subject while viewing the photographic subject panoramically.

After the desired position on the photographic subject is specified, the captured-image retrieving unit identifies a three-dimensional position, on the three-dimensional model, corresponding to the position and retrieves a plurality of captured images each including a pixel corresponding to the identified three-dimensional position from the group of captured images obtained by image capturing of the photographic subject. Each captured image in the group of captured images obtained by image capturing of the photographic subject has an overlap region that overlaps other captured images, and therefore, the group of captured images includes a plurality of captured images each including a pixel corresponding to the specific three-dimensional position on the photographic subject.

The captured-image determination unit determines an optimum captured image from among the plurality of retrieved captured images or determines the priority levels of the plurality of retrieved captured images, and the second display control unit displays the determined optimum captured image on the display unit or displays some or all of the plurality of captured images on the display unit in accordance with the determined priority levels.

Accordingly, the optimum captured image among the plurality of captured images each including a pixel of a desired three-dimensional point of the photographic subject can be displayed or some or all of the plurality of captured images can be displayed in accordance with the priority levels.

Preferably, in the image display apparatus according to another aspect of the present invention, the captured-image determination unit determines the optimum captured image or determines the priority levels of the plurality of retrieved captured images, on the basis of at least one condition among a degree of facing of each captured image relative to the photographic subject, a distance of each captured image to the photographic subject, an amount of shift between a position, on each captured image, corresponding to the identified three-dimensional position and a center position of the captured image, and a distinction of each captured image.

Preferably, in the image display apparatus according to yet another aspect of the present invention, the view operation is an operation for enlarging, reducing, translating, or rotating the three-dimensional model to be displayed on the display unit, and the first display control unit enlarges, reduces, translates, or rotates the three-dimensional model to be displayed on the display unit on the basis of the view operation.

In the image display apparatus according to yet another aspect of the present invention, the three-dimensional model is a three-dimensional model represented by a three-dimensional point cloud formed of three-dimensional information of a large number of points on a surface of the photographic subject, a three-dimensional model representing the surface of the photographic subject by an aggregate of polygons on the basis of the three-dimensional point cloud, or a three-dimensional model obtained by texture mapping in which captured images obtained by image capturing of the photographic subject are mapped to the polygons.

Preferably, in the image display apparatus according to yet another aspect of the present invention, the first display control unit displays the three-dimensional model in a first display region of the display unit, and the second display control unit displays the captured image or the captured images in a second display region of the display unit.

Preferably, the image display apparatus according to yet another aspect of the present invention further includes a display switching unit that switches between display of the three-dimensional model on the display unit by the first display control unit and display of the captured image or the captured images on the display unit by the second display control unit.

Preferably, the image display apparatus according to yet another aspect of the present invention further includes: a third display control unit that displays an image list indicating the group of captured images on the display unit; a third operation unit that accepts an instruction for selecting any captured image from the image list in accordance with a user operation; a positional information obtaining unit that obtains positional information of a position on the three-dimensional model, the positional information corresponding to the captured image for which the instruction for selection is given; and a fourth display control unit that reads and displays on the display unit the three-dimensional model stored in the storage unit, the fourth display control unit superimposing and displaying a mark indicating a position of the captured image for which the instruction for selection is given, on the three-dimensional model displayed on the display unit, on the basis of the positional information of the position on the three-dimensional model obtained by the positional information obtaining unit.

Preferably, the image display apparatus according to yet another aspect of the present invention further includes: a condition setting unit that sets a condition for narrowing down captured images to be extracted from the group of captured images and/or for sorting the group of captured images; and an image list creation unit that creates the image list indicating captured images obtained by narrowing down the group of captured images and/or the image list obtained by sorting the group of captured images, on the basis of the condition set by the condition setting unit, in which the third display control unit updates the image list displayed on the display unit with the image list created by the image list creation unit.

Preferably, in the image display apparatus according to yet another aspect of the present invention, an item displayed in the image list includes at least one of a minified image of each captured image in the group of captured images, identification information for identifying each captured image, a degree of facing of each captured image relative to the photographic subject, a distance of each captured image to the photographic subject, a distinction of each captured image, information indicating whether each captured image is linked to an inspection record of the photographic subject, a damage detection result, or a repair record, or an image capture date and time.

Preferably, in the image display apparatus according to yet another aspect of the present invention, the fourth display control unit displays the three-dimensional model on which the mark is superimposed and displayed in a first display region of the display unit, and reads from the storage unit and displays in a second display region of the display unit, the captured image for which the instruction for selection is given.

Preferably, in the image display apparatus according to yet another aspect of the present invention, the fourth display control unit enlarges, translates, or rotates the three-dimensional model to be displayed on the display unit, on the basis of the obtained positional information of the position on the three-dimensional model and allows the mark superimposed and displayed on the three-dimensional model to be easily visible.

An image display method according to yet another aspect of the present invention includes: a step of preparing a storage unit that stores a three-dimensional model of a photographic subject and a group of captured images obtained by image capturing of the photographic subject from different image capture positions and in different image capture directions relative to the photographic subject; a step, by a first operation unit, in a case where the three-dimensional model stored in the storage unit is to be displayed on a display unit, of accepting a view operation for the three-dimensional model to be displayed on the display unit; a first display step, by a first display control unit, of reading and displaying on the display unit the three-dimensional model stored in the storage unit and displaying the three-dimensional model on the basis of the view operation accepted by the first operation unit; a step, by a second operation unit, of accepting, in accordance with a user operation, positional information indicating a position on the three-dimensional model displayed on the display unit; a step, by a captured-image retrieving unit, of identifying a three-dimensional position on the three-dimensional model on the basis of the accepted positional information and retrieving a plurality of captured images each including a pixel corresponding to the identified three-dimensional position from the group of captured images stored in the storage unit; a step, by a captured-image determination unit, of determining an optimum captured image from among the plurality of retrieved captured images or determining priority levels of the plurality of retrieved captured images; and a second display step, by a second display control unit, of displaying the determined optimum captured image on the display unit or displaying some or all of the plurality of captured images in accordance with the determined priority levels.

Preferably, in the image display method according to yet another aspect of the present invention, the step of determining a captured image includes determining the optimum captured image or determining the priority levels of the plurality of retrieved captured images, on the basis of at least one condition among a degree of facing of each captured image relative to the photographic subject, a distance of each captured image to the photographic subject, an amount of shift between a position, on each captured image, corresponding to the identified three-dimensional position and a center position of the captured image, and a distinction of each captured image.

Preferably, in the image display method according to yet another aspect of the present invention, the view operation is an operation for enlarging, reducing, translating, or rotating the three-dimensional model to be displayed on the display unit, and the first display step includes enlarging, reducing, translating, or rotating the three-dimensional model to be displayed on the display unit on the basis of the view operation.

Preferably, in the image display method according to yet another aspect of the present invention, the three-dimensional model is a three-dimensional model represented by a three-dimensional point cloud formed of three-dimensional information of a large number of points on a surface of the photographic subject, a three-dimensional model representing the surface of the photographic subject by an aggregate of polygons on the basis of the three-dimensional point cloud, or a three-dimensional model obtained by texture mapping in which captured images obtained by image capturing of the photographic subject are mapped to the polygons.

Preferably, in the image display method according to yet another aspect of the present invention, the first display step includes displaying the three-dimensional model in a first display region of the display unit, and the second display step includes displaying the captured image or the captured images in a second display region of the display unit.

Preferably, in the image display method according to yet another aspect of the present invention, a display switching unit switches between display of the three-dimensional model on the display unit in the first display step and display of the captured image or the captured images on the display unit in the second display step.

Preferably, the image display method according to yet another aspect of the present invention further includes: a third display step, by a third display control unit, of displaying an image list indicating the group of captured images on the display unit; a step, by a third operation unit, of accepting an instruction for selecting any captured image from the image list in accordance with a user operation; a step, by a positional information obtaining unit, of obtaining positional information of a position on the three-dimensional model, the positional information corresponding to the captured image for which the instruction for selection is given; and a fourth display step, by a fourth display control unit, of reading and displaying on the display unit the three-dimensional model stored in the storage unit, the fourth display step including superimposing and displaying a mark indicating a position of the captured image for which the instruction for selection is given, on the three-dimensional model displayed on the display unit, on the basis of the obtained positional information of the position on the three-dimensional model.

Preferably, the image display method according to yet another aspect of the present invention further includes: a step, by a condition setting unit, of setting a condition for narrowing down captured images to be extracted from the group of captured images and/or for sorting the group of captured images; and a step, by an image list creation unit, of creating the image list indicating captured images obtained by narrowing down the group of captured images and/or the image list obtained by sorting the group of captured images, on the basis of the set condition, in which the third display step includes updating the image list displayed on the display unit with the created image list.

Preferably, in the image display method according to yet another aspect of the present invention, an item displayed in the image list includes at least one of a minified image of each captured image in the group of captured images, identification information for identifying each captured image, a degree of facing of each captured image relative to the photographic subject, a distance of each captured image to the photographic subject, a distinction of each captured image, information indicating whether each captured image is linked to an inspection record of the photographic subject, a damage detection result, or a repair record, or an image capture date and time.

Preferably, in the image display method according to yet another aspect of the present invention, the fourth display step includes displaying the three-dimensional model on which the mark is superimposed and displayed in a first display region of the display unit, and reading from the storage unit and displaying in a second display region of the display unit, the captured image for which the instruction for selection is given.

Preferably, in the image display method according to yet another aspect of the present invention, the fourth display step includes enlarging, translating, or rotating the three-dimensional model to be displayed on the display unit, on the basis of the obtained positional information of the position on the three-dimensional model and allowing the mark superimposed and displayed on the three-dimensional model to be easily visible.

An image display program according to yet another aspect of the present invention is an image display program to be installed in a computer capable of accessing a storage unit that stores a three-dimensional model of a photographic subject and a group of captured images obtained by image capturing of the photographic subject from different image capture positions and in different image capture directions relative to the photographic subject, the image display program causing the computer to implement: a function of, in a case where the three-dimensional model stored in the storage unit is to be displayed on a display unit, accepting a view operation for the three-dimensional model; a function of reading and displaying on the display unit the three-dimensional model stored in the storage unit and displaying the three-dimensional model on the basis of the view operation; a function of accepting, in accordance with a user operation, positional information indicating a position on the three-dimensional model displayed on the display unit; a function of identifying a three-dimensional position on the three-dimensional model on the basis of the accepted positional information and retrieving a plurality of captured images each including a pixel corresponding to the identified three-dimensional position from the group of captured images stored in the storage unit; a function of determining an optimum captured image from among the plurality of retrieved captured images or determining priority levels of the plurality of retrieved captured images; and a function of displaying the determined optimum captured image on the display unit or displaying some or all of the plurality of captured images on the display unit in accordance with the determined priority levels.

Preferably, the image display program according to yet another aspect of the present invention causes the computer to further implement: a function of displaying an image list indicating the group of captured images on the display unit; a function of accepting an instruction for selecting a captured image selected from the image list in accordance with a user operation; a function of obtaining positional information of a position on the three-dimensional model, the positional information corresponding to the captured image for which the instruction for selection is given; and a function of reading and displaying on the display unit the three-dimensional model stored in the storage unit, the function including superimposing and displaying a mark indicating a position of the captured image for which the instruction for selection is given, on the three-dimensional model displayed on the display unit, on the basis of the obtained positional information of the position on the three-dimensional model.

An image display apparatus according to yet another aspect of the present invention includes: a storage unit that stores a three-dimensional model of a photographic subject and a group of captured images obtained by image capturing of the photographic subject from different image capture positions and in different image capture directions relative to the photographic subject; and a processor that, in a case where the three-dimensional model stored in the storage unit is to be displayed on a display unit, accepts a view operation for the three-dimensional model, reads and displays on the display unit the three-dimensional model stored in the storage unit and displays the three-dimensional model on the basis of the view operation, accepts, in accordance with a user operation, positional information indicating a position on the three-dimensional model displayed on the display unit, identifies a three-dimensional position on the three-dimensional model on the basis of the accepted positional information and retrieves a plurality of captured images each including a pixel corresponding to the identified three-dimensional position from the group of captured images stored in the storage unit, determines an optimum captured image from among the plurality of retrieved captured images or determines priority levels of the plurality of retrieved captured images, and displays the determined optimum captured image on the display unit or displays some or all of the plurality of captured images on the display unit in accordance with the determined priority levels.

According to the present invention, it is possible to retrieve a plurality of captured images each including a position specified by a user from a group of captured images obtained by image capturing of a photographic subject, such as a construction, and to display an optimum captured image among the plurality of captured images or display some or all of the plurality of captured images in accordance with their priority levels.

BRIEF DESCRIPTION OF THE DRAWINGS

FIG. 10 is a diagram illustrating an example damage data table corresponding to a panel;

DESCRIPTION OF THE PREFERRED EMBODIMENTS

Hereinafter, preferred embodiments of an image display apparatus, an image display method, and an image display program according to the present invention will be described with reference to the attached drawings.

Hardware Configuration of Image Display Apparatus

Figure 1:
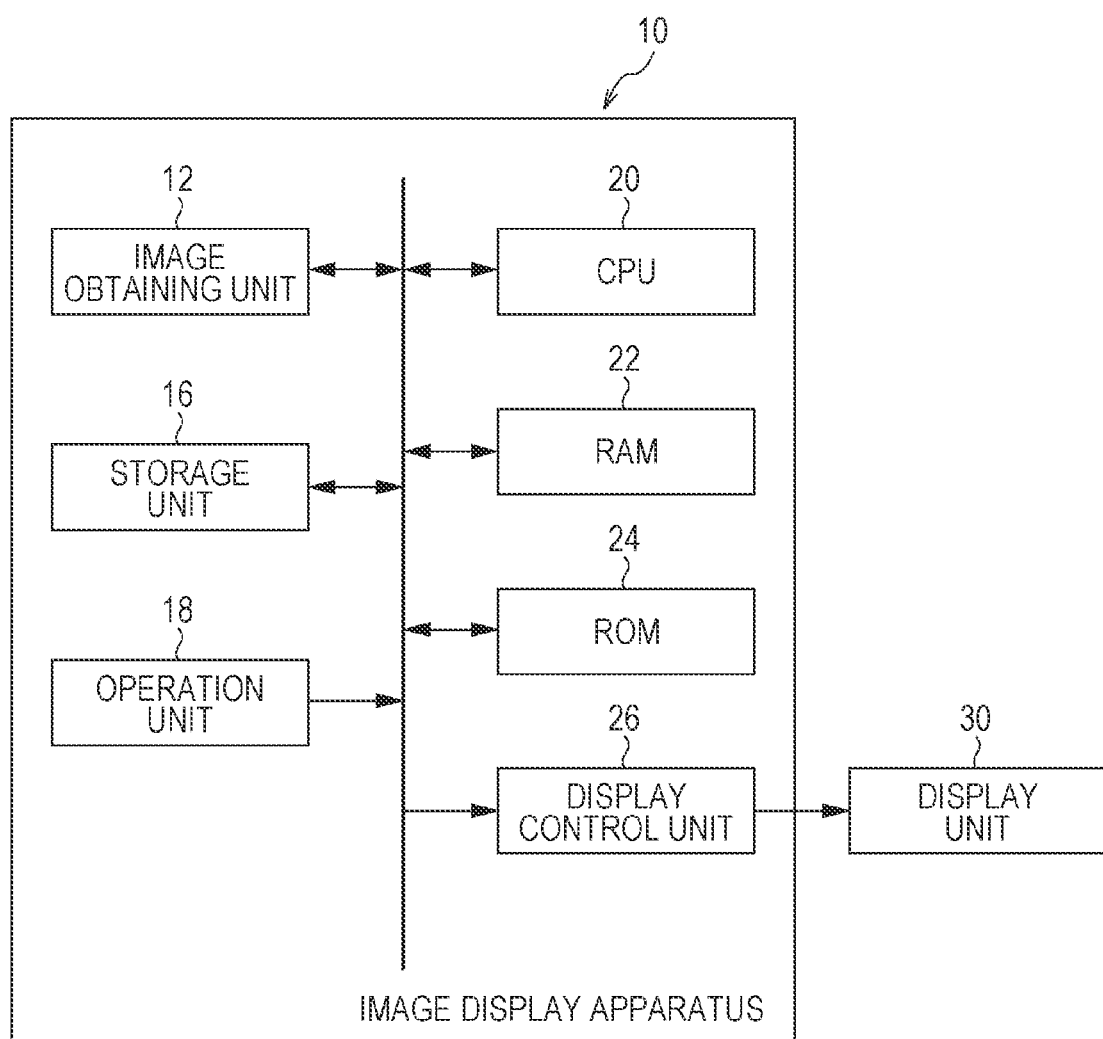
FIG. 1 is a block diagram illustrating an example hardware configuration of an image display apparatus according to the present invention.

FIG. 1 is a block diagram illustrating an example hardware configuration of the image display apparatus according to the present invention.

As an image display apparatus 10 illustrated in FIG. 1, a personal computer or a workstation can be used. The image display apparatus 10 of this example is mainly constituted by an image obtaining unit 12, a storage unit 16, an operation unit 18, a CPU (central processing unit) 20, a RAM (random access memory) 22, a ROM (read-only memory) 24, and a display control unit 26.

The image obtaining unit 12 corresponds to an input/output interface and obtains, for example, captured images obtained by image capturing of a photographic subject. The photographic subject in this example is an inspection target construction, such as a bridge or a tunnel.

Images obtained by the image obtaining unit 12 are, for example, a large number of images (group of captured images) obtained by image capturing of the photographic subject (construction) using a drone (unattended flying device) in which a camera is mounted. The group of captured images completely covers the construction, and preferably, captured images adjacent to each other overlap such that the overlap is about 80% of each image. Therefore, the group of captured images includes 1000 or more images in accordance with the size of the construction.

The group of captured images obtained by the image obtaining unit 12 is stored in the storage unit 16.

Figure 2:
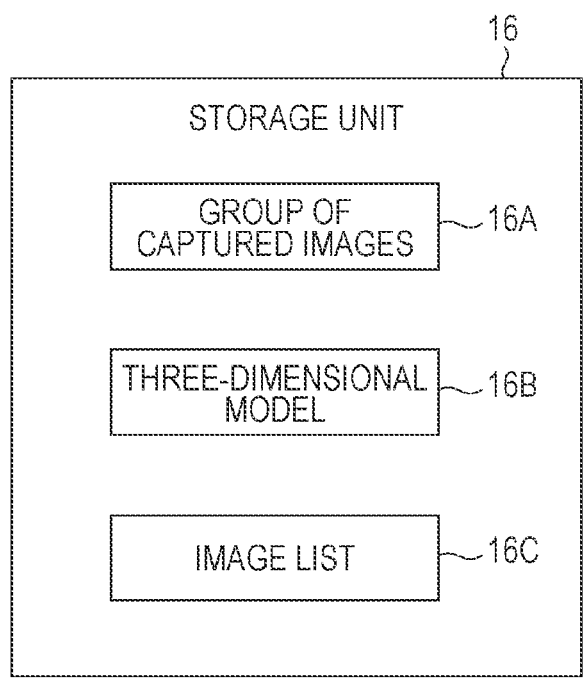
FIG. 2 is a schematic diagram illustrating a group of captured images, a three-dimensional model, and an image list stored in a storage unit.

The storage unit 16 is a storage unit formed of, for example, a hard disk device or a flash memory. As illustrated in FIG. 2, in the storage unit 16, a group of captured images 16A, a three-dimensional model 16B of the construction, and an image list 16C are stored.

Figure 3:
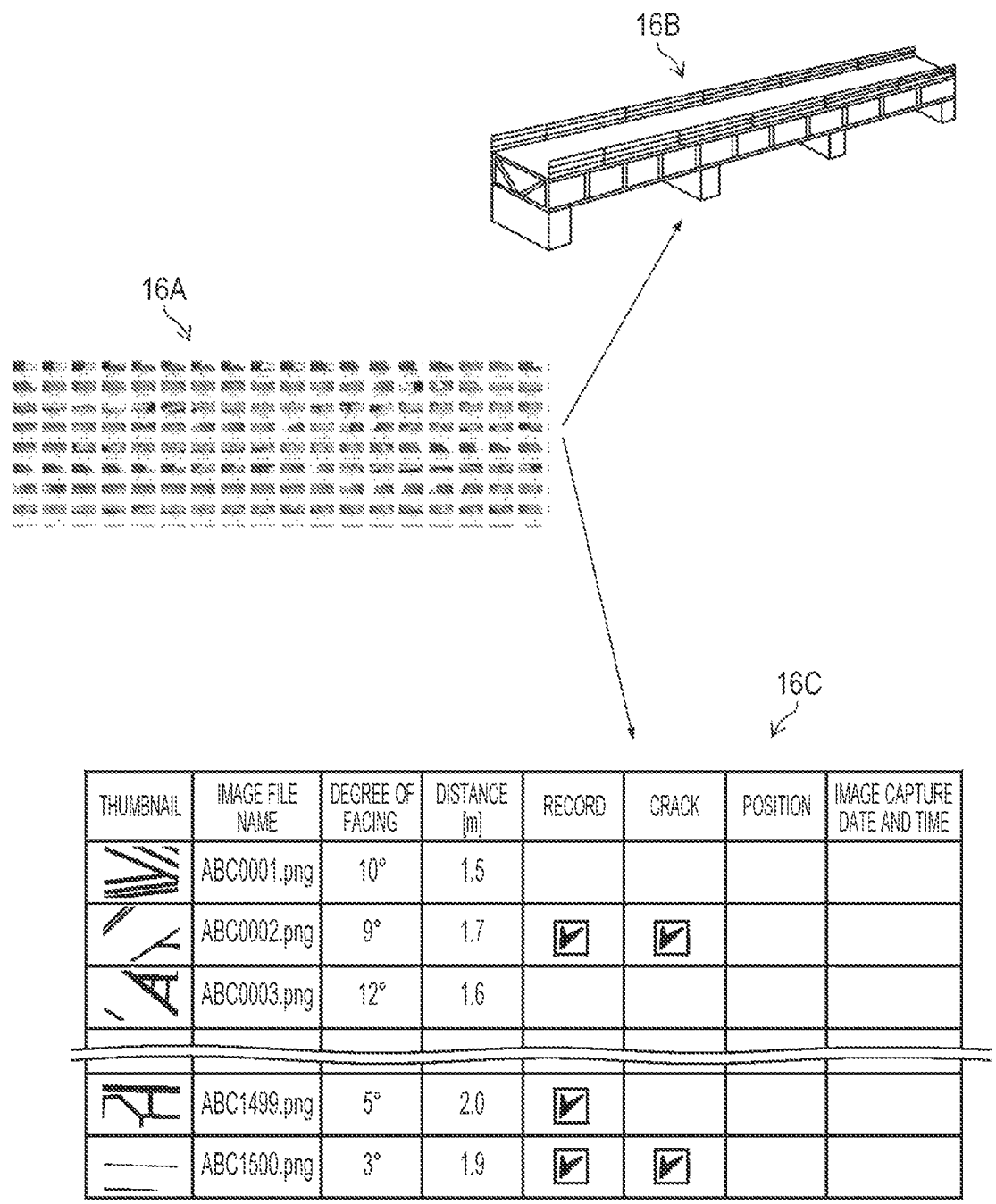
FIG. 3 is a schematic diagram illustrating that a three-dimensional model and an image list are generated on the basis of a group of captured images.

As illustrated by the schematic diagram in FIG. 3, the three-dimensional model 16B and the image list 16C can be generated on the basis of the group of captured images 16A. The three-dimensional model 16B and the image list 16C will be described in detail below.

Further, in the storage unit 16, an operating system, the image display program according to the present invention, various parameters, and so on are stored.

The operation unit 18 includes a UI (user interface) including a keyboard, a mouse, and so on connected to the computer by wire or wirelessly. In this example, the keyboard, the mouse, and so on function as an operation unit that accepts usual operations input to the computer, also function as a first operation unit that accepts a view operation including an operation for enlarging a three-dimensional model to be displayed on a screen of a display unit 30, also function as a second operation unit that accepts, in accordance with a user operation, positional information indicating a position on the three-dimensional model displayed on the display unit 30, and further function as a third operation unit that accepts an instruction for selecting any captured image from the image list in accordance with a user operation.

The operation unit 18 also functions as an operation unit for a condition setting unit that sets a condition (narrow-down condition) for narrowing down captured images to be extracted from the group of captured images and/or a condition (sort condition) for sorting the group of captured images.

Figure 4:
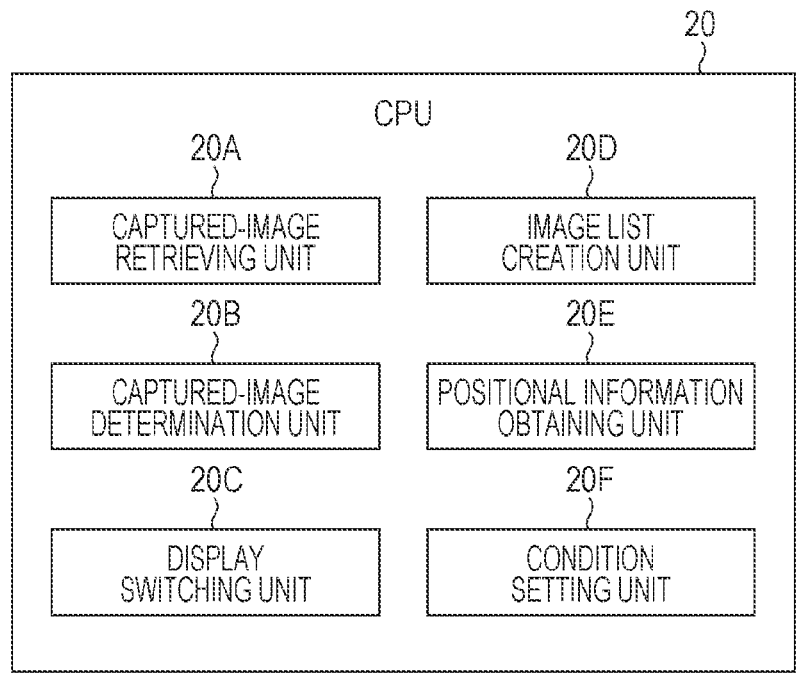
FIG. 4 is a functional block diagram illustrating functions of a CPU.

The CPU 20 accepts input from the operation unit 18 and performs various processes. Specifically, the CPU 20 reads various programs stored in, for example, the storage unit 16 or the ROM 24 and centrally controls each unit on the basis of input from the operation unit 18. The CPU 20 has functions of, for example, a captured-image retrieving unit 20A, a captured-image determination unit 20B, a display switching unit 20C, an image list creation unit 20D, a positional information obtaining unit 20E, and a condition setting unit 20F as illustrated in FIG. 4, by executing the image display program according to the present invention.

The RAM 22 is used as a work area of the CPU 20 and is used as a storage unit that temporarily stores read programs and various types of data.

The display control unit 26 is formed of, for example, a GPU (graphics processing unit) and creates display data for display on the display unit 30. The display control unit 26 is a unit responsible for output to the display unit 30. In this example, the display control unit 26 functions as a first display control unit that reads and displays on the display unit 30 the three-dimensional model 16B stored in the storage unit 16 and enlarges and displays the three-dimensional model 16B on the basis of a view operation including an operation for enlarging the three-dimensional model 16B performed by using the operation unit 18. The display control unit 26 also functions as a second display control unit that reads from the storage unit 16 a captured image determined by the captured-image determination unit 20B (CPU 20) and displays the read captured image on the display unit 30. Note that the display control unit 26 may be implemented as the CPU 20 instead of the GPU described above.

The display control unit 26 also functions as a third display control unit that displays an image list created by the image list creation unit 20D (CPU 20) on the display unit 30. The display control unit 26 further functions as a fourth display control unit that reads and displays on the display unit 30 the three-dimensional model stored in the storage unit 16, the fourth display control unit superimposing and displaying on the three-dimensional model displayed on the display unit 30, a mark indicating the position of a captured image for which an instruction for selection has been given by using the operation unit 18 (third operation unit), on the basis of positional information of a position on the three-dimensional model obtained by the positional information obtaining unit 20E.

As the display unit 30, any type of monitor, such as a liquid crystal monitor, that can be connected to the computer is used. The display unit 30 displays various types of information including a three-dimensional model, a captured image, and an image list on the basis of display data input from the display control unit 26 and is also used as a part of the user interface together with the operation unit 18.

The image display apparatus 10 thus configured displays various types of information on the display unit 30 in accordance with an operation using the operation unit 18, by the CPU 20 reading the image display program according to the present invention stored in the storage unit 16 or the ROM 24 and executing the image display program in accordance with an instruction input from the operation unit 18.

The three-dimensional model includes a three-dimensional point cloud obtained by extracting feature points in overlapping captured images in the group of captured images obtained by image capturing of the construction, estimating the position and attitude of the camera mounted in the drone on the basis of the extracted feature points, and simultaneously estimating the three-dimensional positions of the feature points from the results of estimation of the position and attitude of the camera.

A Structure from Motion (SfM) technique is available in which motion of a large number of feature points is tracked in the group of captured images in which the image capture position of the camera moves in accordance with movement of the drone, thereby estimating the three-dimensional structure of the construction and the attitude (motion) of the camera simultaneously. Recently, an optimized calculation method called bundle adjustment has been developed, which can provide highly accurate output.

As parameters (the focal length, the image size of the image sensor, the pixel pitch, and so on) of the camera necessary for using the SfM technique, parameters stored in the storage unit 16 can be used. Although it is not possible to obtain an absolute scale with the SfM technique, an absolute scale (three-dimensional position) can be obtained by giving a known size (for example, the distance between two points) of the construction.

Here, as the three-dimensional model, a three-dimensional model represented by a three-dimensional point cloud of a large number of points on the surface of the construction, a three-dimensional model representing the surface of the construction by an aggregate of polygons (for example, triangular patches) on the basis of the three-dimensional point cloud, or a three-dimensional model obtained by texture mapping in which captured images (textures) obtained by image capturing of the construction are mapped to the polygons is possible. It is assumed that the three-dimensional model of the construction of this example is a three-dimensional model obtained by texture mapping in which captured images are mapped to the polygons.

Regular inspection of the construction is conducted for each of the management segments that are segments of inspection units of parts and members that constitute the construction.

A description is given below while assuming, for example, a bridge as the construction.

Figure 5:
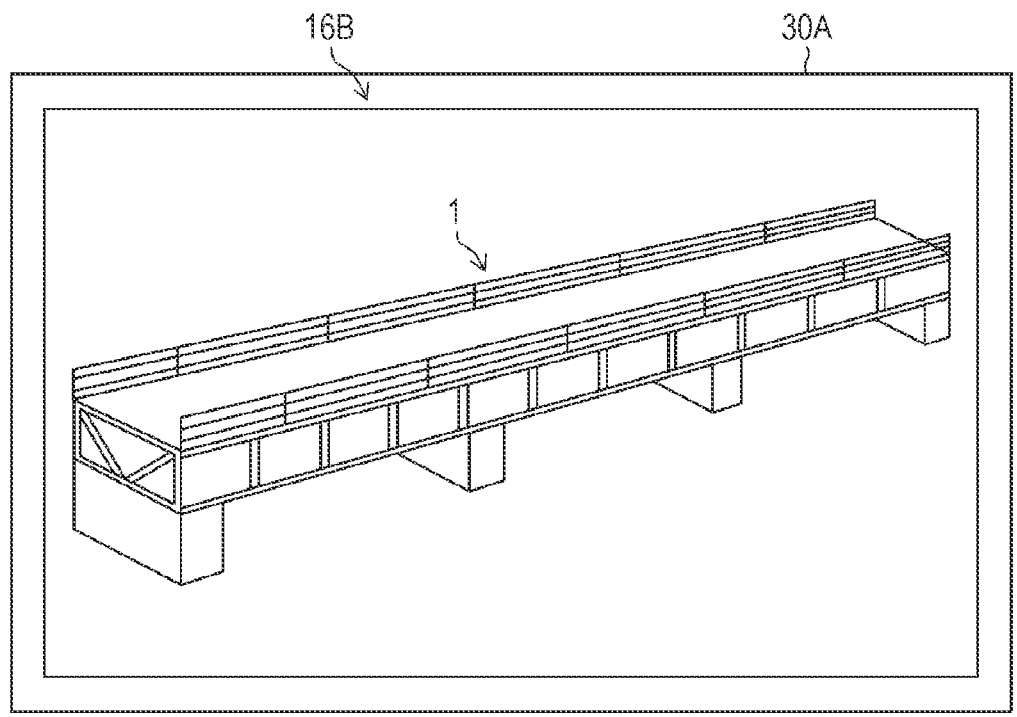
FIG. 5 is a diagram illustrating an example screen of a display unit on which a three-dimensional model representing an overall view of a bridge that is a photographic subject is displayed.
Figure 6:
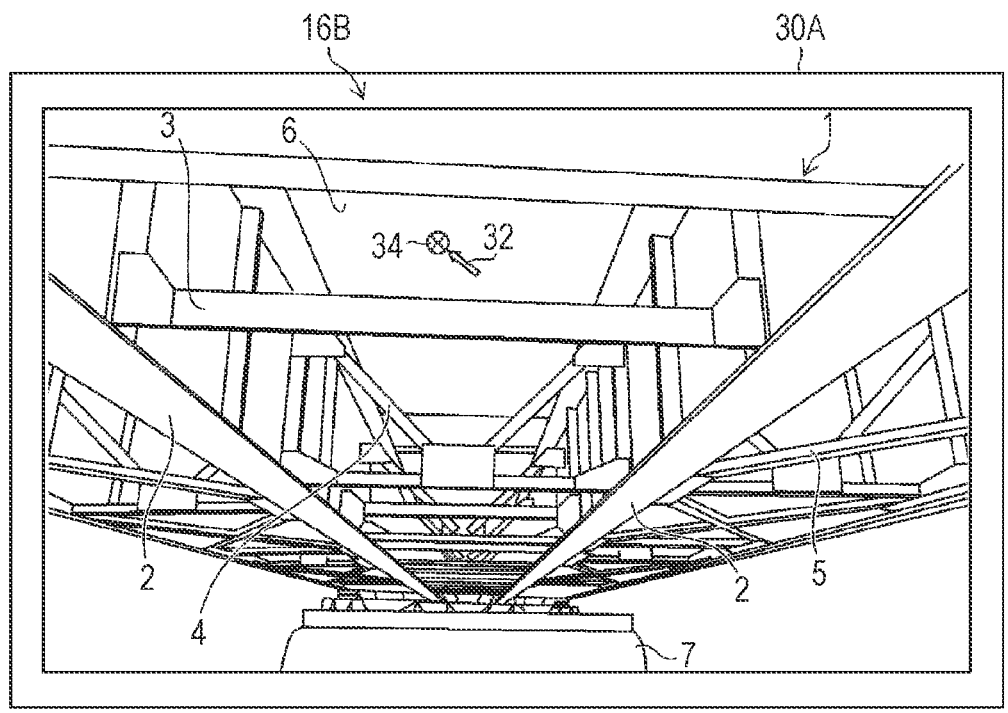
FIG. 6 is a diagram illustrating an example screen of the display unit on which a three-dimensional model of a bridge moved three-dimensionally by a view operation for, for example, enlargement is displayed.

FIG. 5 is a diagram illustrating an example of a screen 30A of the display unit 30 on which the three-dimensional model 16B that represents an overall view of a bridge 1 is displayed. FIG. 6 is a diagram illustrating an example of the screen 30A of the display unit 30 on which the three-dimensional model 16B of the bridge 1 moved three-dimensionally by a view operation for, for example, enlargement is displayed.

In FIG. 6, the bridge 1 displayed on the screen 30A is constituted by various members including main girders 2 that are laid over piers 7, cross girders 3 that are provided in a direction orthogonal to the main girders 2 and each couple the main girders 2, and sway bracing 4 and lateral bracing 5 that couple the main girders 2 to each other to resist lateral loads imposed by, for example, winds or earthquakes. Over the main girders 2 and so on, a floor slab 6 on which vehicles and so on are traveling is formed by pouring concrete. The floor slab 6 is typically built of reinforced concrete.

The floor slab 6 is usually constituted by panels, which are basic units, having a rectangular shape and each defined by the main girders 2 and the cross girders 3. Inspection of the floor slab 6 for damage (cracks, concrete peeling, and so on) is conducted for each panel.

Therefore, each panel of the floor slab 6 is one of the management segments that are inspection units of parts and members that constitute the construction (bridge). Segments of parts and members that constitute the construction and that can be management segments of the bridge include segments of parts and members that constitute the construction (the main girders 2, the cross girders 3, the sway bracing 4, the lateral bracing 5, and the piers 7 (pillar parts, wall parts, beam parts, corner parts, and joint parts)) in addition to the floor slab 6 (panels).

In the storage unit 16, management information for each of the management segments of the construction can be stored.

As the management information for each of the management segments of the construction, an ortho-image corresponding to the management segment of the construction, an ortho-image on which a damage diagram is superimposed, a damage diagram, a damage data table, a repair diagram, or a repair data table is possible. These types of management information are created when inspection of the construction is conducted or when repair is made.

Figure 7:
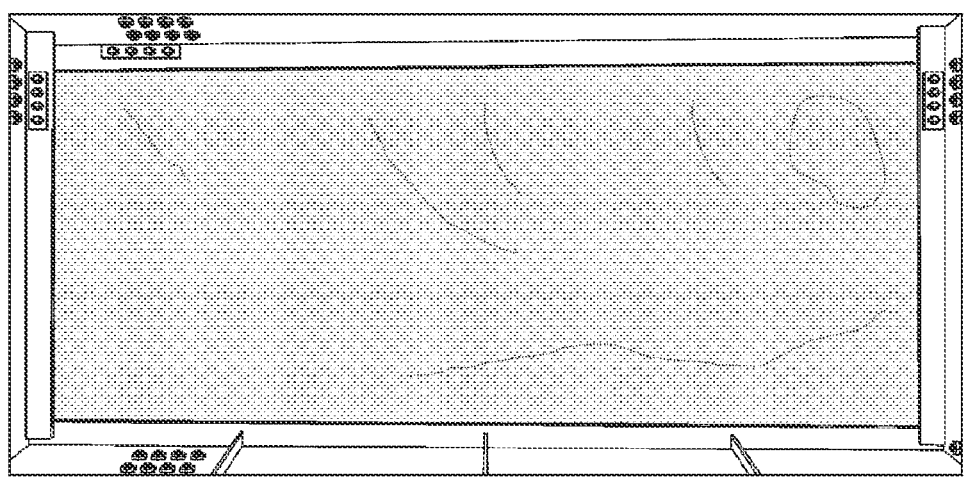
FIG. 7 is a diagram illustrating an example ortho-image corresponding to a panel of a floor slab that is one of the management segments of a bridge.

FIG. 7 is a diagram illustrating an example ortho-image corresponding to a panel of the bridge.

The ortho-image is an image obtained by orthogonal projection of captured images of the photographic subject (panel) onto the surface of the panel. An ortho-image of one panel can be created by extracting a plurality of captured images corresponding to the panel from the group of captured images stored in the storage unit 16, performing panoramic composition of the plurality of extracted captured images, and performing a projective transformation of the panoramic composite image such that the panoramic composite image is an image that is orthogonally projected onto the surface of the panel.

Panoramic composition of the plurality of captured images can be performed by image processing in which a plurality of feature points in an overlap region of overlapping captured images are extracted and the plurality of extracted feature points in one of the overlapping captured images are made to correspond to those in the other overlapping captured image respectively. Orthogonal projection of the panoramic composite image onto the surface of the panel can be performed by a projective transformation in which positions corresponding to the four corners of the panel in the panoramic composite image are made to correspond to the three-dimensional positions of the four corners of the panel.

Figure 8:
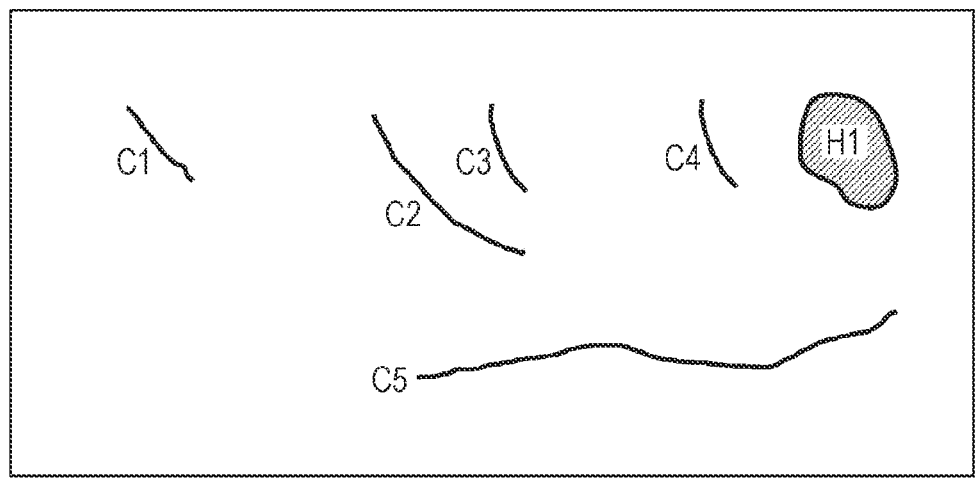
FIG. 8 is a diagram illustrating an example damage diagram corresponding to a panel.

FIG. 8 is a diagram illustrating an example damage diagram corresponding to a panel.

The damage diagram illustrated in FIG. 8 shows five cracks C1 to C5 and concrete peeling H1. The damage diagram can be generated by manually tracing damage, such as cracks and peeling, visually recognized on the ortho-image or by performing image processing for automatically detecting damage from the ortho-image and manually making a correction as necessary.

Figure 9:
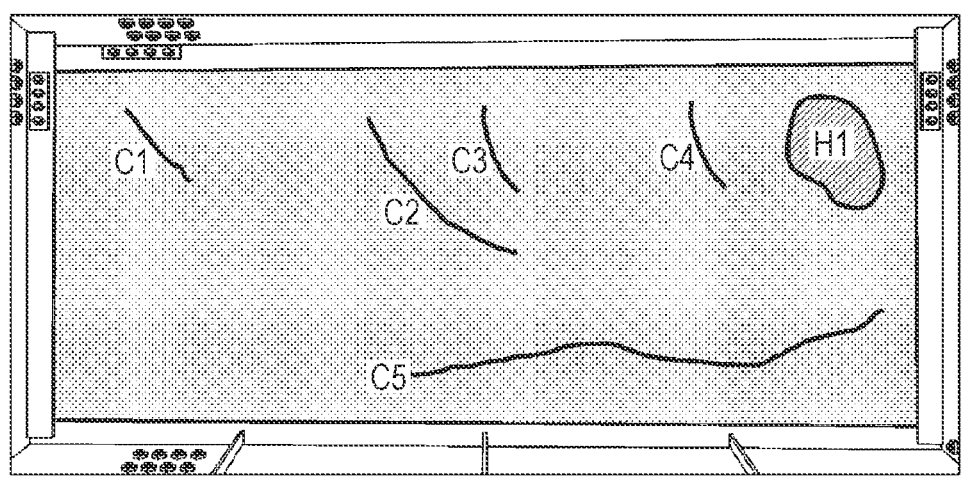
FIG. 9 is a diagram illustrating an example ortho-image on which a damage diagram corresponding to a panel is superimposed.

FIG. 9 is a diagram illustrating an example ortho-image on which a damage diagram corresponding to a panel is superimposed.

The ortho-image illustrated in FIG. 9 on which a damage diagram is superimposed can be created by superimposing the damage diagram illustrated in FIG. 8 on the ortho-image illustrated in FIG. 7.

The damage diagram is created while damage portions are shown in a conspicuous color, such as red. When the damage diagram is superimposed on the ortho-image, the damage portions can be visually recognized easily.

FIG. 10 is a diagram illustrating an example damage data table corresponding to a panel.

The damage data table illustrated in FIG. 10 has items, that is, a damage ID (identification), a damage type, a size (width), a size (length), and a size (area), and includes information corresponding to each item for each damage portion.

Now, the image list 16C stored in the storage unit 16 will be described.

Figure 11:
FIG. 11 is a diagram illustrating an example image list.
Figure 11:
Figure 11:
Figure 11:
Figure 11:

FIG. 11 is a diagram illustrating an example of the image list 16C.

The image list 16C illustrated in FIG. 11 includes attributes of each captured image in the group of captured images 16A, information for managing each captured image, and information for linking each captured image and the three-dimensional model 16B to each other.

Items displayed in the image list 16C illustrated in FIG. 11 include a minified image (thumbnail) of each captured image, identification information (image file name) for identifying each captured image, the degree of facing of each captured image relative to the construction, the distance of each captured image to the construction, information indicating whether each captured image is linked to an inspection record of the construction, information indicating whether each captured image is linked to the result of detecting damage, such as a crack (for example, the damage diagram illustrated in FIG. 8 or the damage data table illustrated in FIG. 10), positional information (three-dimensional position information) of the construction present in each captured image, and the image capture date and time. Note that items included in the image list 16C are not limited to the above-described examples and, for example, the distinction of each captured image and information indicating whether each captured image is linked to a repair record (repair diagram) can be included.

Here, the degree of facing of a captured image in this example means an angle between a direction normal to a surface of the construction corresponding to the captured image and the image capture direction of the camera at the time of capturing of the captured image. Therefore, as the degree of facing (angle) is smaller, the captured image is an image captured from a position closer to a position right in front of the construction and is a favorable image. The distance of a captured image to the construction is the distance (image capture distance) between the construction corresponding to the captured image and the camera used at the time of capturing of the captured image.

Positional information of the construction present in a captured image can be a three-dimensional point cloud of the construction in an area present in the captured image or representative three-dimensional points (for example, three-dimensional points in the four corners of the captured image or three-dimensional points in the vicinity of the four corners) of the three-dimensional point cloud. The positional information of the construction present in the captured image is information for linking the group of captured images 16A and the three-dimensional model 16B to each other.

Image Display Method

First Embodiment

Figure 12:
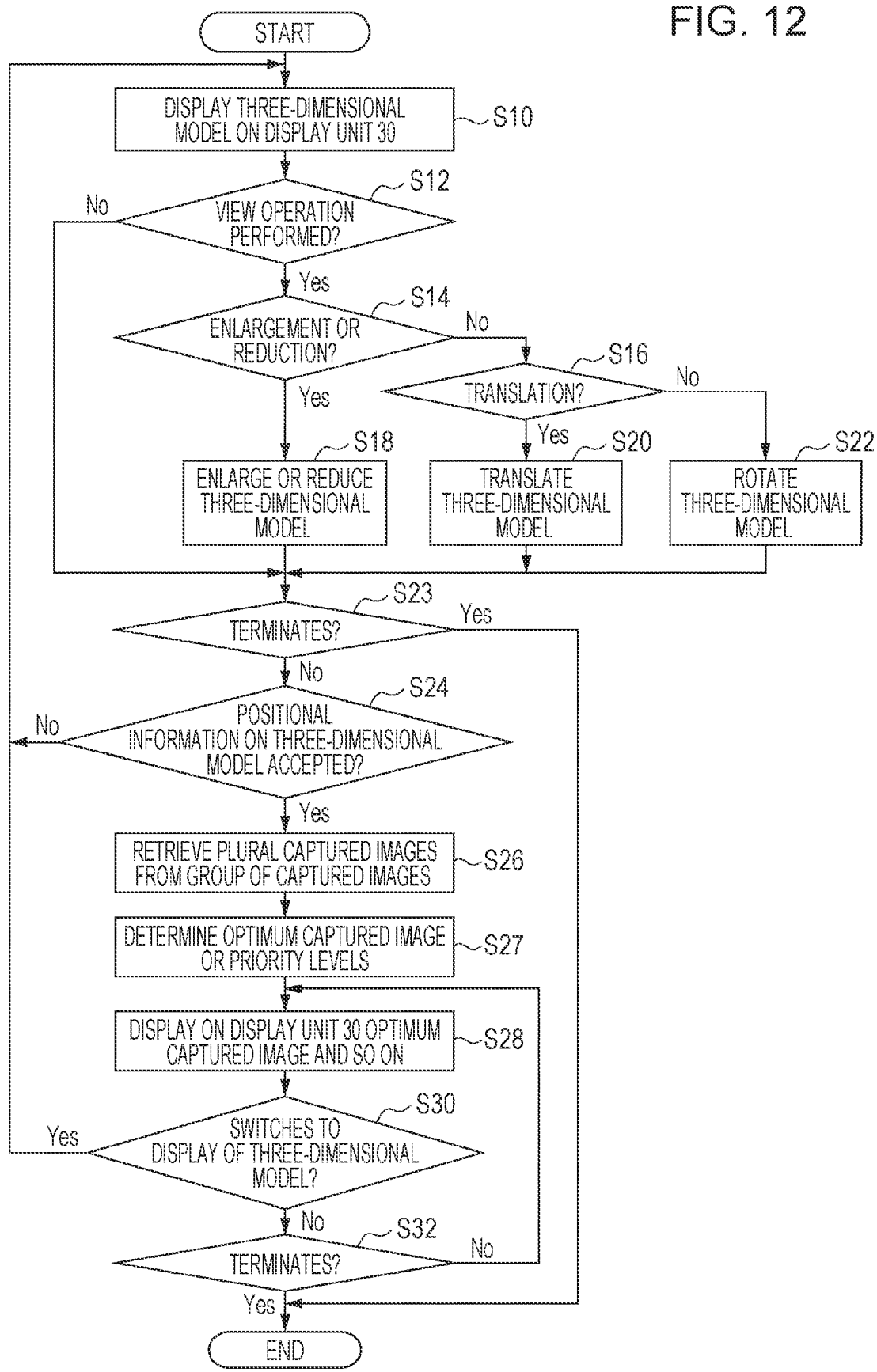
FIG. 12 is a flowchart illustrating a first embodiment of an image display method according to the present invention.

FIG. 12 is a flowchart illustrating a first embodiment of the image display method according to the present invention.

With reference to FIG. 12, the first embodiment of the image display method according to the present invention will be described by describing operations of the units of the image display apparatus 10 illustrated in FIG. 1 and FIG. 4.

In the storage unit 16 of the image display apparatus 10, the group of captured images 16A obtained by image capturing of a construction (a bridge in this example), the three-dimensional model 16B, and the image list 16C are stored as illustrated in FIG. 2. In a case of performing the image display method of this example, the storage unit 16 as described above is to be prepared in advance.

In FIG. 12, the display control unit 26 that functions as the first display control unit first reads the three-dimensional model 16B stored in the storage unit 16 and displays the three-dimensional model 16B on the display unit 30 (step S10, first display step). Here, in a case where the display control unit 26 displays the three-dimensional model 16B on the display unit 30 for the first time, preferably, the display control unit 26 displays the three-dimensional model 16B that represents an overall view of the bridge on the screen 30A of the display unit 30 such that the user can grasp the all aspects of the bridge 1 that is a construction, as illustrated in FIG. 5.

Subsequently, the CPU 20 or the display control unit 26 determines whether a view operation for, for example, enlargement is performed by the user for the three-dimensional model 16B displayed on the screen 30A (step S12). A view operation is an operation for enlarging and displaying the three-dimensional model 16B displayed on the screen 30A in three dimensions (3D), reducing and displaying the three-dimensional model 16B, translating the three-dimensional model 16B, or rotating the three-dimensional model 16B and is performed by using the operation unit 18 that functions as the first operation unit. In this case, although a 3D mouse is suitable as the first operation unit that accepts the view operation by the user, a usual mouse or the like can be used.

If it is determined in step S12 that a view operation is performed (in the case of "Yes"), the CPU 20 or the display control unit 26 determines whether the view operation is an operation for enlarging or reducing the three-dimensional model 16B, an operation for translating the three-dimensional model 16B, or an operation for rotating the three-dimensional model 16B (step S14 and step S16).

If a view operation for enlarging or reducing the three-dimensional model 16B is performed by using the operation unit 18, the display control unit 26 that functions as the first display control unit creates display data for enlarging or reducing the three-dimensional model 16B in accordance with an instruction for enlargement or reduction given by the view operation and outputs the display data to the display unit 30 (step S18). If a view operation for translating the three-dimensional model 16B is performed by using the operation unit 18, the display control unit 26 creates display data for translating the three-dimensional model 16B in accordance with an instruction for translation given by the view operation and outputs the display data to the display unit 30 (step S20). If a view operation for rotating the three-dimensional model 16B is performed by using the operation unit 18, the display control unit 26 creates display data for rotating the three-dimensional model 16B in accordance with an instruction for rotation given by the view operation and outputs the display data to the display unit 30 (step S22).

If it is determined in step S12 that a view operation is not performed (in the case of "No") or when the process in step S18, S20, or S22 ends, the CPU 20 advances the flow to step S23.

In step S23, the CPU 20 determines whether an instruction for terminating image display from the operation unit 18 is input. If an instruction for termination is not input (in the case of "No"), the flow proceeds to step S24. If an instruction for termination is input (in the case of "Yes"), the process for image display is terminated.

Next, the CPU 20 determines whether positional information indicating a position on the three-dimensional model 16B displayed on the display unit 30 is accepted in accordance with a user operation using the operation unit 18 that functions as the second operation unit (step S24).

If positional information indicating a position on the three-dimensional model 16B is not accepted (in the case of "No"), the flow returns to step S10, and the display control unit 26 continuously displays the three-dimensional model 16B on the display unit 30. In a case where a view operation has been performed and display data for enlarging or reducing the three-dimensional model 16B, display data for translating the three-dimensional model 16B, or display data for rotating the three-dimensional model 16B has been created in step S18, S20, or S22, the three-dimensional model 16B enlarged or reduced, translated, or rotated (moved three-dimensionally) on the basis of the latest display data is displayed on the display unit 30.

FIG. 6 is a diagram illustrating an example of the screen 30A of the display unit 30 on which the three-dimensional model 16B of a bridge moved three-dimensionally by a view operation for, for example, enlargement is displayed.

That is, in accordance with a view operation by the user, the three-dimensional model 16B of the bridge 1 to be displayed on the screen 30A of the display unit 30 can be changed from the three-dimensional model 16B representing an overall view of the bridge 1 illustrated in FIG. 5 to the three-dimensional model 16B that is enlarged, moved, and rotated as illustrated in FIG. 6. The view operation is performed in order to allow a portion that requires inspection to be easily visible to the user while the user is grasping the all aspects of the bridge in space with the three-dimensional model 16B.

FIG. 6 illustrates a cursor 32 that indicates an input position on the screen 30A of the display unit 30. The cursor 32 can be moved on the screen 30A in accordance with an operation using the operation unit 18 (a pointing device, such as a mouse).

In a case where the user wants to check a desired inspection portion of the bridge, the user moves the three-dimensional model 16B three-dimensionally while grasping the all aspects of the bridge in space with the three-dimensional model 16B to search for the desired inspection portion on the screen 30A of the display unit 30. The user moves the cursor 32 onto the desired inspection portion on the screen 30A of the display unit 30 and performs an input operation by a click operation using a mouse or by using an execution key. Accordingly, a position on the three-dimensional model 16B displayed on the screen 30A of the display unit 30 can be specified with the operation unit 18, and the operation unit 18 can accept positional information indicating the specified position.

In FIG. 6, the cursor 32 is positioned on the floor slab 6 of the bridge 1. When, for example, a click operation using a mouse is performed at this time, preferably, the display control unit 26 that functions as the first display control unit superimposes and displays a mark 34 indicating that an instruction for selecting the desired inspection portion in the floor slab 6 has been performed, at the position indicated by the cursor 32 on the three-dimensional model 16B.

Referring back to FIG. 12, if it is determined in step S24 that positional information indicating a position on the three-dimensional model 16B enlarged and displayed on the display unit 30 is accepted (in the case of "Yes"), the flow proceeds to step S26.

In step S26, the CPU 20 that functions as the captured-image retrieving unit 20A first identifies a three-dimensional position on the three-dimensional model 16B on the basis of the positional information of the position indicated by the cursor 32 on (the three-dimensional model 16B displayed on) the screen 30A of the display unit 30. The positional information of the position indicated by the cursor 32 on the screen 30A of the display unit 30 can be obtained as coordinate information of the position on the screen 30A. Meanwhile, the three-dimensional model 16B displayed on the screen 30A of the display unit 30 is enlarged, translated, or rotated by the view operation.

Therefore, the three-dimensional position on the three-dimensional model 16B can be identified on the basis of the positional information (coordinate information) of the position on the three-dimensional model 16B subjected to the view operation for, for example, enlargement and displayed on the screen 30A of the display unit 30 and on the basis of information about the enlargement ratio, the amount of translation, and the amount of rotation of the three-dimensional model 16B based on the view operation.

Subsequently, the CPU 20 that functions as the captured-image retrieving unit 20A retrieves a plurality of captured images each including a pixel corresponding to the identified three-dimensional position from the group of captured images 16A stored in the storage unit 16, on the basis of the identified three-dimensional position on the three-dimensional model 16B (step S26).

In a case of retrieving the plurality of captured images, information for linking the group of captured images 16A and the three-dimensional model 16B to each other (positional information of the construction present in each captured image in the image list 16C illustrated in FIG. 11) can be used. For example, it is possible to retrieve the plurality of captured images by narrowing down the group of captured images 16A to captured images each including a position the same as the identified three-dimensional position on the three-dimensional model 16B or each having positional information that includes the identified three-dimensional position on the three-dimensional model 16B, in the image list 16C. As described above, regarding the group of captured images 16A, each captured image in the group of captured images 16A has an overlap region that overlaps other captured images, and therefore, the group of captured images 16A includes a plurality of captured images each including a pixel corresponding to the identified three-dimensional position on the three-dimensional model 16B.

Next, the CPU 20 that functions as the captured-image determination unit 20B determines an optimum captured image from among the plurality of captured images retrieved in step S26 or determines the priority levels of the plurality of retrieved captured images (step S27).

Here, the captured-image determination unit 20B can determine an optimum captured image from among the plurality of captured images or determine the priority levels by using the degree of facing of each captured image relative to the photographic subject (construction) or the distance of each captured image to the construction registered in the image list 16C illustrated in FIG. 11. For example, the captured-image determination unit 20B can determine a captured image obtained by image capturing of the construction from a position closer to a position right in front of the construction to be a more suitable captured image on the basis of the degree of facing of each captured image. The captured-image determination unit 20B can determine a captured image obtained by image capturing of the construction at a shorter range to be a more suitable captured image on the basis of the distance of each captured image to the construction. Note that as the distance of a captured image to the construction, the image capture distance recorded as tag information of the image file (Exif (Exchangeable image file format) file) of the captured image can be used. Information (GPS (global positioning system) information) about the camera position recorded as tag information of the Exif file can be used to calculate the image capture distance on the basis of the camera position and the identified three-dimensional position (a position converted to GPS information) on the three-dimensional model 16B.

Further, the captured-image determination unit 20B can calculate the amount of shift between a position, on each captured image, corresponding to the identified three-dimensional position and the center position of the captured image and determine a captured image for which the calculated amount of shift is smaller to be a more suitable captured image. The captured-image determination unit 20B can determine a captured image in which the distinction (contrast) is higher (in a local region that includes a pixel corresponding to the identified three-dimensional position on the three-dimensional model 16B) to be a more suitable captured image.

The captured-image determination unit 20B determines an optimum captured image from among the plurality of retrieved captured images or determines the priority levels of the plurality of retrieved captured images, on the basis of at least one condition among the above-described conditions on the degree of facing, the distance, and so on.

After an optimum captured image or the priority levels are determined by the captured-image determination unit 20B, the display control unit 26 that functions as the second display control unit reads the determined optimum captured image from the storage unit 16 and displays the read optimum captured image on the display unit 30, or displays some or all of the plurality of captured images on the display unit 30 in accordance with the determined priority levels (step S28, second display step).

Accordingly, when the position of a portion that requires inspection is specified on the three-dimensional model 16B of the bridge moved three-dimensionally by a view operation, an optimum captured image among a plurality of captured images retrieved on the basis of the specified position or the priority levels are determined. The determined optimum captured image or some or all of the captured images (hereinafter referred to as "optimum captured image and so on") can be displayed on the display unit 30, some or all of the captured images being displayed in accordance with the priority levels, and the captured images of the desired inspection portion can be easily checked.

Figure 13:
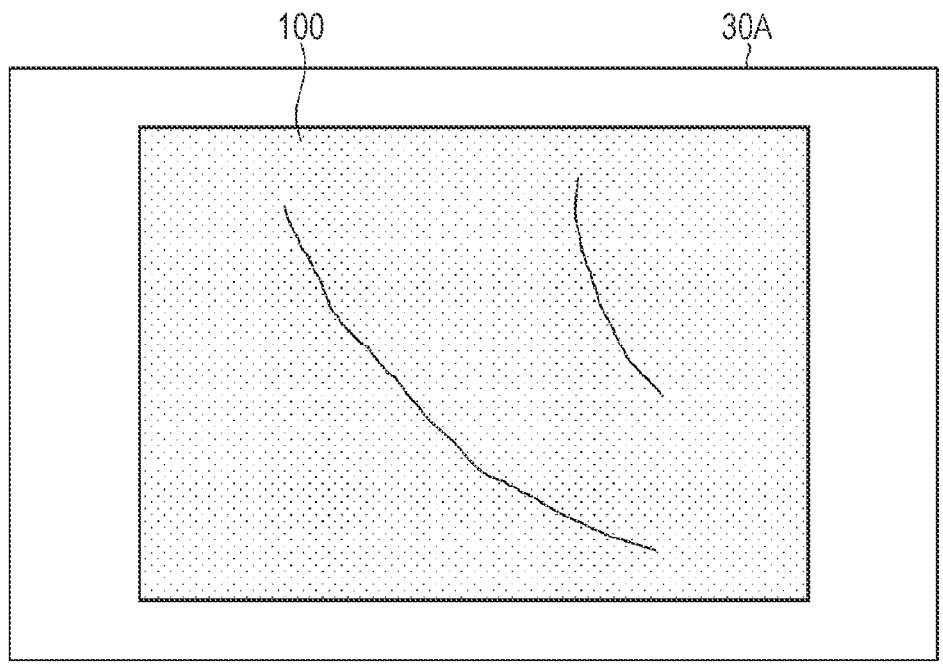
FIG. 13 is a diagram illustrating an example screen of the display unit on which an optimum captured image determined from among a plurality of captured images is displayed.

FIG. 13 is a diagram illustrating an example of the screen 30A of the display unit 30 on which an optimum captured image 100 determined from among a plurality of captured images is displayed.

In this example, in a case of displaying the optimum captured image 100 on the display unit 30, the CPU 20 that functions as the display switching unit 20C switches the function of the display control unit 26 from the first display control unit to the second display control unit. Switching of display from the three-dimensional model 16B to the optimum captured image 100 by the display switching unit 20C can be automatically performed when the optimum captured image 100 is determined by the captured-image determination unit 20B and display of the optimum captured image 100 becomes possible.

Figure 14:
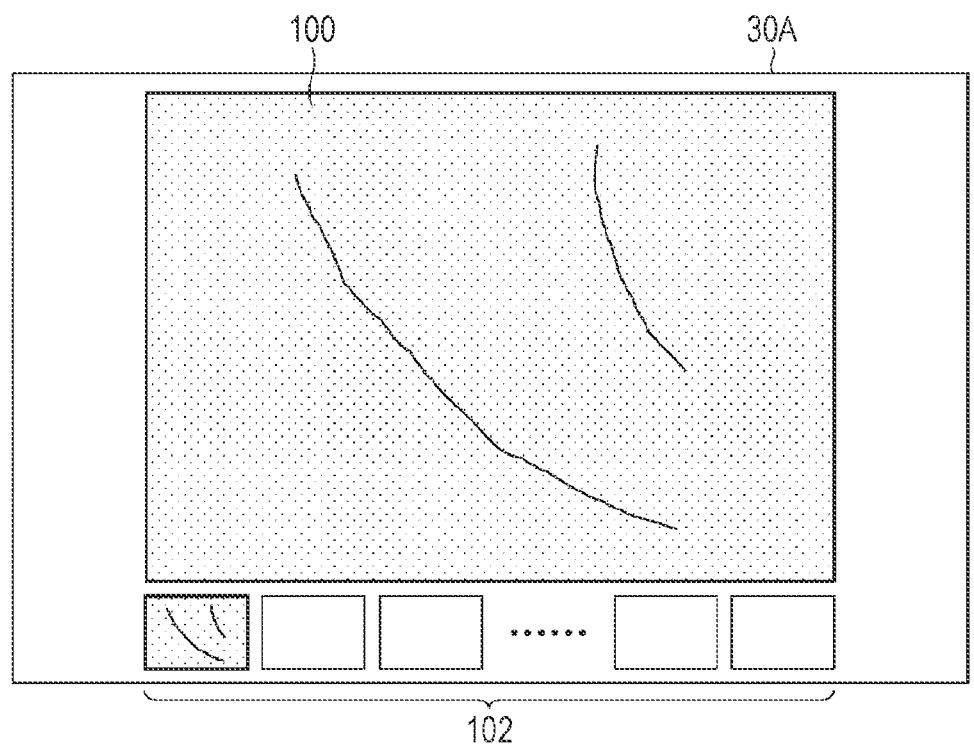
FIG. 14 is a diagram illustrating another example screen of the display unit on which an optimum captured image determined from among a plurality of captured images is displayed.

FIG. 14 is a diagram illustrating another example of the screen 30A of the display unit 30 on which the optimum captured image 100 determined from among a plurality of captured images is displayed.

In the example illustrated in FIG. 14, one captured image 100 is displayed on the screen 30A of the display unit 30, and thumbnails 102 of a plurality of captured images are displayed in the lower part of the screen 30A. The thumbnails 102 of the plurality of captured images are arranged in accordance with the priority levels of the plurality of captured images, and the optimum captured image 100 (the captured image having the highest priority level) among the plurality of captured images is displayed in the first place.

When the user selects a desired thumbnail 102 from among the thumbnails 102 arranged in accordance with the priority levels, the original image (captured image) corresponding to the thumbnail 102 can be displayed on the screen 30A of the display unit 30.

Figure 15:
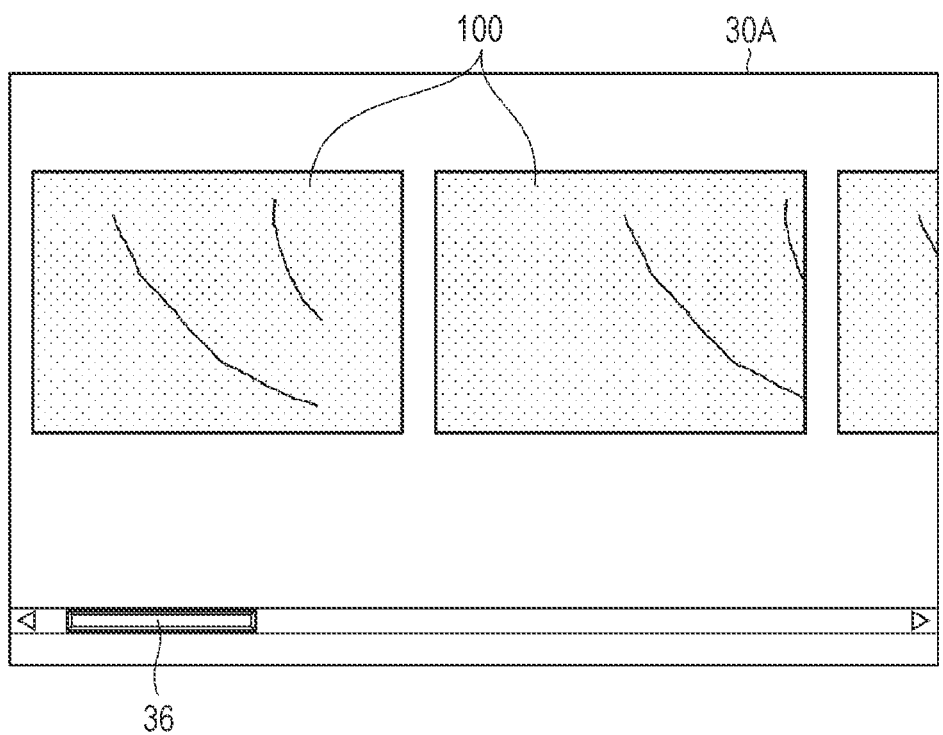
FIG. 15 is a diagram illustrating yet another example screen of the display unit on which an optimum captured image and so on determined from among a plurality of captured images are displayed.

FIG. 15 is a diagram illustrating yet another example of the screen 30A of the display unit 30 on which an optimum captured image and so on determined from among a plurality of captured images are displayed.

In the example illustrated in FIG. 15, a plurality of captured images 100 are displayed on the screen 30A of the display unit 30, and a scroll bar 36 is displayed in the lower part of the screen 30A. The plurality of captured images are assigned priority levels, and the plurality of captured images including the captured image 100 having the highest priority level are displayed first.

In a case where the user wants to view a captured image not displayed on the screen 30A of the display unit 30, the user can move the captured images 100 to be displayed on the screen 30A of the display unit 30 by operating the scroll bar 36 with a mouse or the like such that the captured images 100 scroll to thereby view the desired captured image.

Referring back to FIG. 12, after the optimum captured image and so on are displayed on the display unit 30, the CPU 20 subsequently determines whether display on the display unit 30 is to be switched from the optimum captured image and so on to the three-dimensional model 16B (step S30). Determination as to whether to switch from the optimum captured image and so on to the three-dimensional model 16B can be performed on the basis of a user operation using the operation unit 18. For example, in a case where the user wants to check a captured image of a different inspection portion, the user can perform a switch operation of switching from display of the optimum captured image and so on to display of the three-dimensional model 16B by using the operation unit 18.

If it is determined in step S30 that display is to be switched from the optimum captured image and so on to the three-dimensional model 16B (in the case of "Yes"), the CPU 20 returns the flow to step S10.

Accordingly, the three-dimensional model 16B that represents an overall view of the bridge can be displayed on the display unit 30 (see FIG. 5). In a case of displaying the three-dimensional model 16B on the display unit 30, the CPU 20 that functions as the display switching unit 20C can switch the function of the display control unit 26 from the second display control unit to the first display control unit.

If it is determined that display is to be switched from the optimum captured image and so on to the three-dimensional model 16B (in the case of "Yes"), the CPU 20 may return the flow to step S12. Accordingly, the three-dimensional model 16B displayed last at the time of switching of display from the three-dimensional model 16B to the optimum captured image and so on can be displayed, and this is suitable in a case where the user wants to check a captured image of an inspection portion close to the previous inspection portion.

On the other hand, if it is determined in step S30 that display is not to be switched from the optimum captured image and so on to the three-dimensional model 16B (in the case of "No"), the flow proceeds to step S32.

In step S32, the CPU 20 determines whether an instruction for terminating image display from the operation unit 18 is input. If an instruction for termination is not input (in the case of "No"), the flow returns to step S28, and the optimum captured image and so on are continuously displayed on the display unit 30. On the other hand, if an instruction for termination is input (in the case of "Yes"), the process for image display is terminated.

In this example, switching between display, on the display unit 30, of the three-dimensional model 16B and display, on the display unit 30, of the optimum captured image and so on is performed on the basis of, for example, a user operation. However, display is not limited to this, and the first display control unit may display the three-dimensional model 16B in a first display region of the display unit 30 and the second display control unit may display an optimum captured image and so on in a second display region of the display unit 30 so as to display the three-dimensional model 16B and the optimum captured image and so on simultaneously.

The three-dimensional model 16B of this example is a three-dimensional model obtained by texture mapping in which captured images are mapped to the polygons. Therefore, when the three-dimensional model 16B is enlarged and displayed, the properties of the surface of the construction can be checked to some extent. However, it is not possible to check slight damage (for example, a crack having a width of 0.1 mm). This is because the data amount of the three-dimensional model 16B is limited and even when the three-dimensional model 16B is enlarged, it is not possible to visually recognize the three-dimensional model 16B as the original captured image or an image equivalent to the original captured image.

In contrast, when the three-dimensional model 16B of the construction is used, a desired inspection portion can be easily checked. When original captured images (an optimum captured image and so on) corresponding to the identified inspection portion are displayed, damage and so on in the inspection portion can be easily checked.

Second Embodiment

Figure 16:
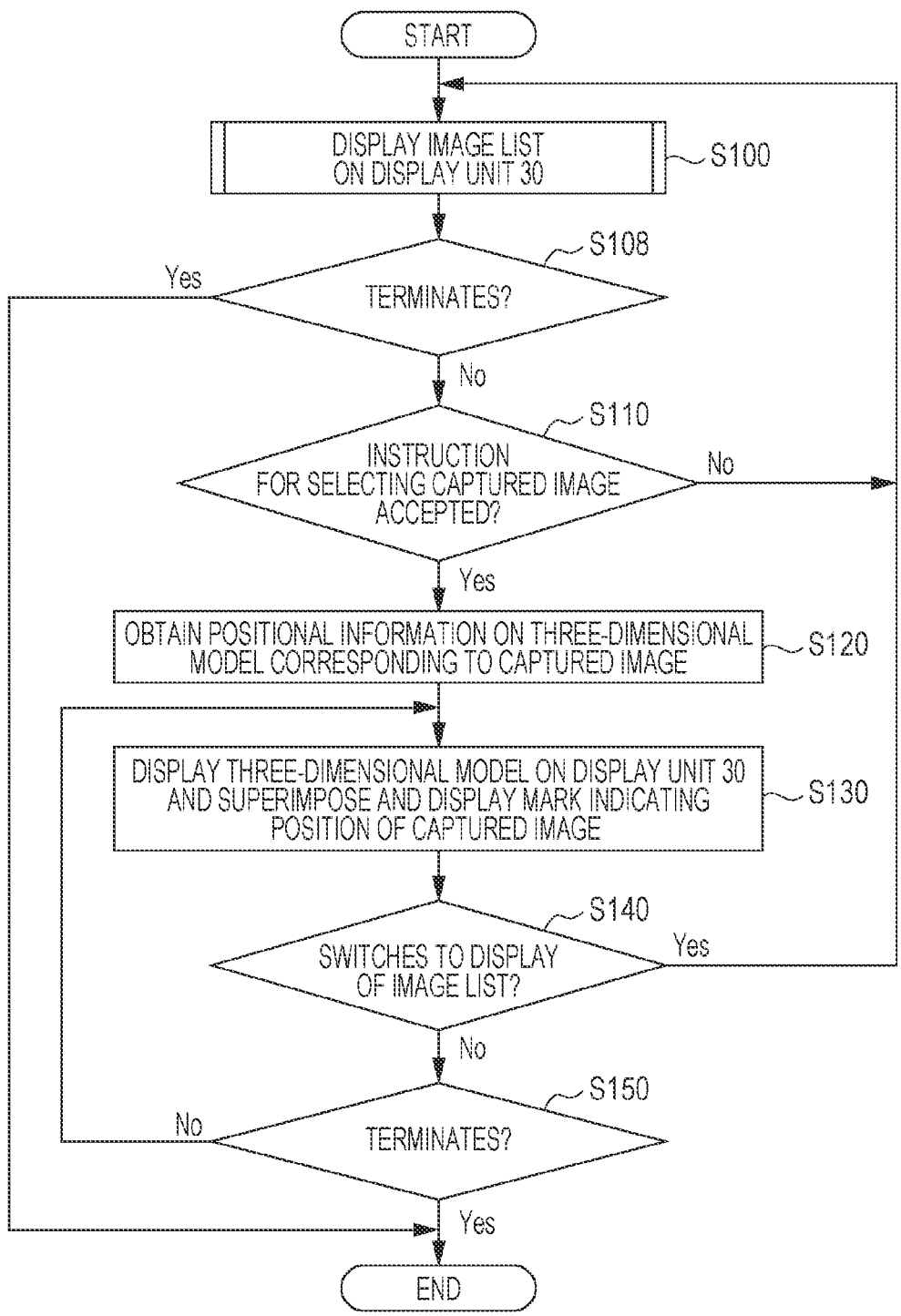
FIG. 16 is a flowchart illustrating a second embodiment of the image display method according to the present invention.

FIG. 16 is a flowchart illustrating a second embodiment of the image display method according to the present invention.

With reference to FIG. 16, the second embodiment of the image display method according to the present invention will be described by describing operations of the units of the image display apparatus 10 illustrated in FIG. 1 and FIG. 4.

The image display method of the second embodiment illustrated in FIG. 16 is a method with which, when a desired captured image is selected from the group of captured images 16A, a position, on the three-dimensional model 16B of the construction, corresponding to the selected captured image is easily checked.

In FIG. 16, the display control unit 26 that functions as the third display control unit reads the image list 16C from the storage unit 16 and displays the read image list 16C on the display unit 30 (step S100, third display step).

The image list 16C includes attributes of each captured image in the group of captured images 16A, information for managing each captured image, and information for linking each captured image and the three-dimensional model 16B to each other, as illustrated in FIG. 11. Although the image list 16C can be created by the CPU 20 that functions as the image list creation unit 20D on the basis of the group of captured images 16A and various types of information linked to the group of captured images 16A, the image list 16C may be created by an external apparatus and stored in the storage unit 16.

Now, the process in step S100 will be described in detail.

Figure 17:
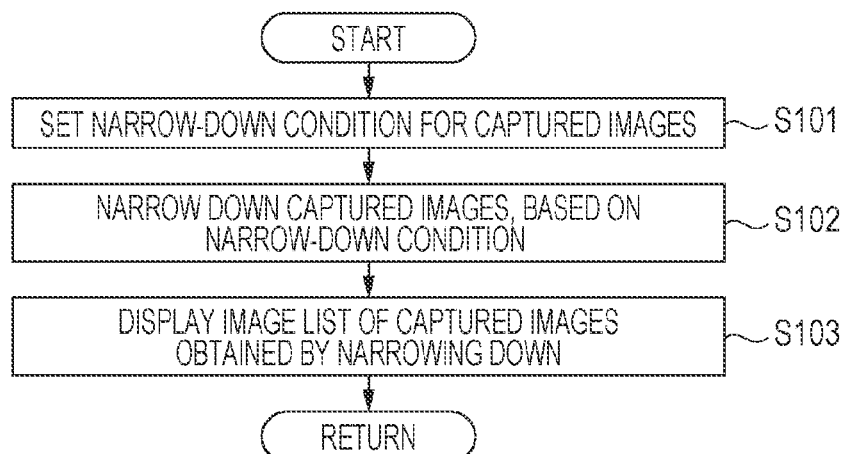
FIG. 17 is a flowchart of a subroutine illustrating a first example of the process in step S100 illustrated in FIG. 16.

FIG. 17 is a flowchart of a subroutine illustrating a first example of the process in step S100.

In FIG. 17, the CPU 20 that functions as the condition setting unit 20F sets a condition (narrow-down condition) for narrowing down captured images to be extracted from the group of captured images 16A, in accordance with a user operation using the operation unit 18 (step S101).

Here, examples of the narrow-down condition include information indicating whether each captured image is linked to an inspection record of the construction, information indicating whether each captured image is linked to a damage (crack) detection result, and information indicating whether each captured image is linked to a repair record (repair diagram).

Note that examples of the narrow-down condition are not limited to those described above and can include, for example, information indicating a management segment of the construction. As described above, regular inspection of the construction is conducted for each of the management segments that are segments of inspection units of parts and members that constitute the construction. In a case where the construction is a bridge, the main girders, the lateral girders, the floor slab (the panels that constitute the floor slab), the piers, and so on correspond to management segments. Information indicating any of these management segments can be used as the narrow-down condition.

The CPU 20 that functions as the image list creation unit 20D narrows down captured images from the group of captured images 16A on the basis of the narrow-down condition set by the condition setting unit 20F and creates an image list indicating captured images obtained by narrowing down (step S102).

The display control unit 26 that functions as the third display control unit displays on the display unit 30 the image list of the captured images obtained by narrowing down based on the narrow-down condition (step S103). Accordingly, the image list displayed on the display unit 30 is updated in accordance with the narrow-down condition set by the user.

For example, when information indicating whether each captured image is linked to an inspection record of the construction is set as the narrow-down condition, an image list including only captured images linked to the inspection record can be displayed on the display unit 30. When information indicating a management segment of the construction is set as the narrow-down condition, an image list including only captured images linked to the set management segment (captured images in which a region of the construction corresponding to the set management segment is present) can be displayed on the display unit 30.

Figure 18:
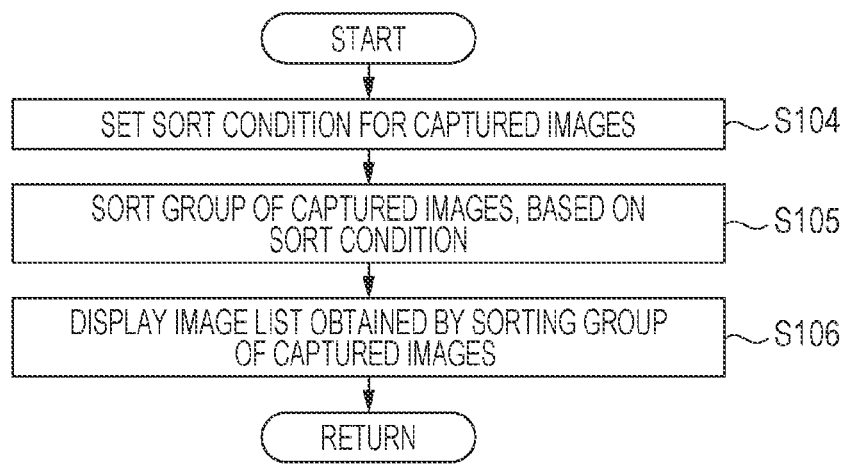
FIG. 18 is a flowchart of a subroutine illustrating a second example of the process in step S100 illustrated in FIG. 16.

FIG. 18 is a flowchart of a subroutine illustrating a second example of the process in step S100.

In FIG. 18, the CPU 20 that functions as the condition setting unit 20F sets a condition (sort condition) for sorting the group of captured images 16A, in accordance with a user operation using the operation unit 18 (step S104).

Here, examples of the sort condition include the degree of facing of each captured image relative to the photographic subject (construction), the distance of each captured image to the construction, and the image capture date and time (see FIG. 11).

Note that examples of the sort condition are not limited to those described above and may be other sort conditions including the distinction and so on of each captured image. However, preferably, the image list 16C at least has information that corresponds to the sort condition.

The CPU 20 that functions as the image list creation unit 20D creates an image list obtained by sorting the group of captured images 16A on the basis of the sort condition set by the condition setting unit 20F (step S105).

The display control unit 26 that functions as the third display control unit displays on the display unit 30 the image list obtained by sorting the group of captured images 16A on the basis of the sort condition (step S106, third display step).

For example, when the image list 16C (original image list) stored in the storage unit 16 is displayed on the display unit 30 and a desired item (sort condition) in the displayed image list is clicked, an image list obtained by sorting the group of captured images 16A in accordance with the sort condition in ascending order or descending order can be displayed on the display unit 30.

Figure 19:
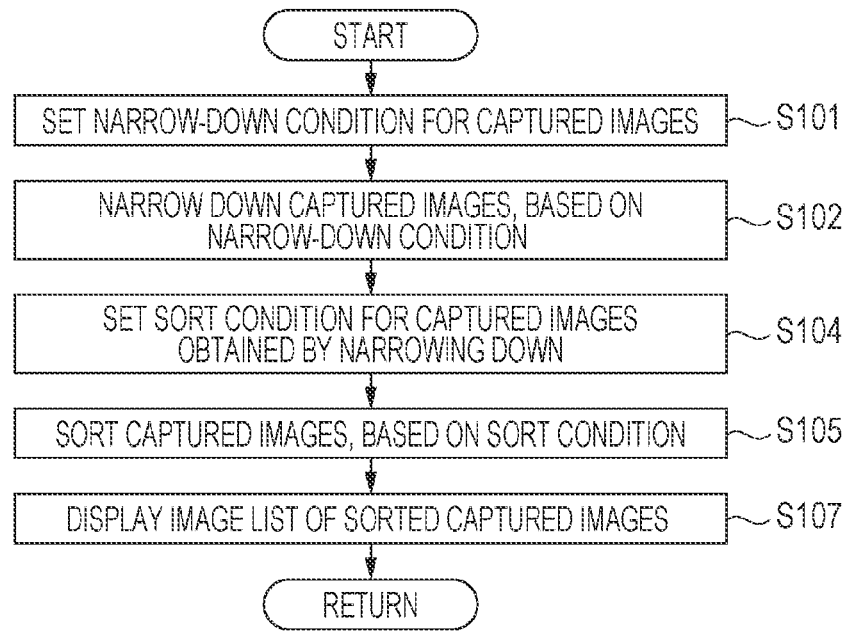
FIG. 19 is a flowchart of a subroutine illustrating a third example of the process in step S100 illustrated in FIG. 16.

FIG. 19 is a flowchart of a subroutine illustrating a third example of the process in step S100. Note that a part in FIG. 19 common to the process in the first example or in the second example respectively illustrated in FIG. 17 or FIG. 18 is assigned the same step number, and a detailed description thereof is omitted.

The third example illustrated in FIG. 19 is a combination of the first example and the second example respectively illustrated in FIG. 17 and FIG. 18. First, captured images are narrowed down from the group of captured images 16A on the basis of the narrow-down condition (step S101 and step S102).

Subsequently, an image list in which captured images obtained by narrowing down are sorted on the basis of the sort condition is created (step S104 and step S105), and the created image list (an image list in which the captured images obtained by narrowing down are sorted) is displayed on the display unit 30 (step S107).

Referring back to FIG. 16, the CPU 20 determines whether to terminate display of the image list displayed on the display unit 30 (step S108). The CPU 20 determines whether an instruction for terminating image display from the operation unit 18 is input. If an instruction for termination is not input (in the case of "No"), the flow proceeds to step S110. If an instruction for termination is input (in the case of "Yes"), the process for image display is terminated.

In step S110, the CPU 20 determines whether an instruction for selecting any captured image from the image list is accepted in accordance with a user operation using the operation unit 18 that functions as the third operation unit.

If it is determined that an instruction for selection is not accepted (in the case of "No"), the flow returns to step S100, the image list is continuously displayed on the display unit 30, and acceptance of an instruction for selecting a captured image becomes possible.

On the other hand, if it is determined that an instruction for selection is accepted (in the case of "Yes"), the CPU 20 that functions as the positional information obtaining unit 20E obtains positional information of a position on the three-dimensional model 16B, the positional information corresponding to the captured image for which the instruction for selection is given (step S120). The positional information can be read and obtained from the image list 16C on the basis of the image file name of the captured image for which the instruction for selection is given.

Subsequently, the display control unit 26 that functions as the fourth display control unit switches display on the display unit 30 from display of the image list 16C to display of the three-dimensional model 16B and so on. That is, the display control unit 26 reads and displays on the display unit 30 the three-dimensional model 16B stored in the storage unit 16, and superimposes and displays a mark indicating the position of the captured image for which the instruction for selection is given, on the three-dimensional model 16B displayed on the display unit 30, on the basis of the positional information of the position on the three-dimensional model 16B obtained by the positional information obtaining unit 20E (step S130, fourth display step).

Figure 20:
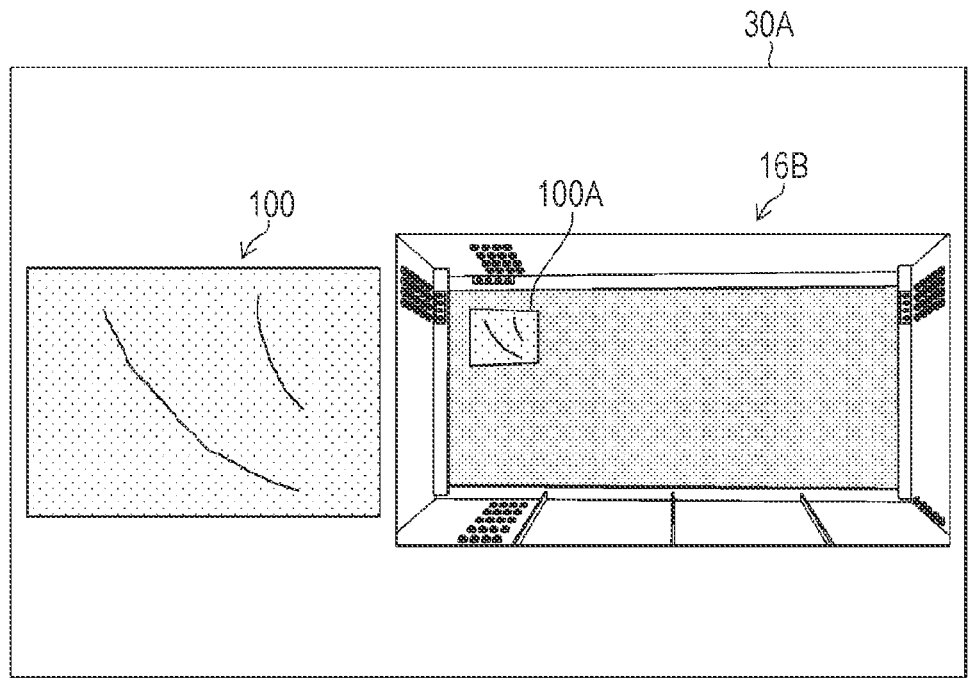
FIG. 20 is a diagram illustrating an example screen of the display unit on which a captured image for which an instruction for selectin has been given and a three-dimensional model that includes the image capture area of the captured image are displayed.

FIG. 20 is a diagram illustrating an example of the screen 30A of the display unit 30 on which the captured image 100 for which an instruction for selectin has been given and the three-dimensional model 16B that includes the image capture area of the captured image 100 are displayed.

In the example illustrated in FIG. 20, the three-dimensional model 16B is automatically enlarged, translated, and rotated and a part of the three-dimensional model 16B is displayed such that the position of the captured image 100 on the three-dimensional model 16B can be easily checked. Note that a view operation for, for example, enlarging the three-dimensional model 16B can be automatically performed on the basis of positional information, recorded to the image list 16C, of the construction present in the captured image 100 (for example, the three-dimensional positions of the four corners of the captured image 100).

In the example illustrated in FIG. 20, the captured image 100 and the three-dimensional model 16B are displayed side by side on the screen 30A of the display unit 30, and a mark 100A indicating the position of the captured image 100 is superimposed and displayed on the three-dimensional model 16B. The mark 100A is displayed as a frame that indicates the image capture area of the captured image 100. The frame that indicates the image capture area of the captured image 100 can be formed of line segments each connecting the three-dimensional positions of corresponding corners among the four corners of the captured image 100.

In a case where the user is unable to grasp the position of the captured image 100 in the entire three-dimensional model 16B with display of a part of the three-dimensional model 16B illustrated in FIG. 20, the user can manually perform a view operation (zoom out operation) for the three-dimensional model 16B such that a wide area of the three-dimensional model 16B (see FIG. 6) is displayed or manually perform a view operation for the three-dimensional model 16B such that an overall view of the three-dimensional model 16B (see FIG. 5) is displayed.

In a case of displaying a wide area of the three-dimensional model 16B, for example, a high-luminance point or a blinking high-luminance point is preferable as the mark indicating the position of the captured image 100 and superimposed and displayed on the three-dimensional model 16B.

In contrast to the above-described example, an overall view of the three-dimensional model 16B on which the mark indicating the position of the captured image 100 is superimposed and displayed is first displayed on the display unit 30 (see FIG. 5). In this case, it is preferable to automatically rotate the three-dimensional model 16B such that the mark can be checked. Accordingly, the user can roughly grasp a part of the construction corresponding to the captured image 100.

In a case where the user wants to specifically grasp the part of the construction corresponding to the captured image 100, the user can manually perform a view operation for enlarging the three-dimensional model 16B (and a view operation for translation and/or rotation as necessary). Accordingly, the three-dimensional model 16B that is enlarged and on which the mark indicating the position of the captured image 100 is superimposed and displayed can be displayed on the display unit 30 (see FIG. 6 and FIG. 20).

With the above-described mark indicating the position of the captured image and superimposed and displayed on the three-dimensional model 16C, the user can easily grasp the position, on the construction (three-dimensional model 16B), corresponding to the captured image for which an instruction for selection has been given on the image list.

Referring back to FIG. 16, the CPU 20 that functions as the display switching unit 20C determines whether display on the display unit 30 is to be switched from display of the three-dimensional model 16B and so on to display of the image list 16C (step S140). Determination as to whether to switch to the image list 16C can be performed on the basis of a user operation using the operation unit 18. For example, in a case where the user wants to select a different captured image, the user can use the operation unit 18 to perform a switch operation of switching to display of the image list 16C.

If it is determined in step S140 that display is to be switched from the three-dimensional model 16B and so on to the image list 16C (in the case of "Yes"), the CPU 20 returns the flow to step S100.

Accordingly, the image list 16C can be displayed on the display unit 30. In a case of displaying the image list 16C on the display unit 30, the CPU 20 that functions as the display switching unit 20C can switch the function of the display control unit 26 from the fourth display control unit to the third display control unit.

On the other hand, if it is determined in step S140 that display is not to be switched to the image list 16C (in the case of "No"), the CPU 20 advances the flow to step S150.

In step S150, the CPU 20 determines whether an instruction for terminating image display from the operation unit 18 is input. If an instruction for termination is not input (in the case of "No"), the flow returns to step S130, and the three-dimensional model 16B and so on are continuously displayed on the display unit 30. On the other hand, if an instruction for termination is input (in the case of "Yes"), the process for image display is terminated.

Although switching between display, on the display unit 30, of the image list 16C and display, on the display unit 30, of the three-dimensional model 16B and so on is performed on the basis of, for example, a user operation in this example, the image list 16C and the three-dimensional model 16B and so on may be simultaneously displayed on the display unit 30.

Others

The user may switch between the image display method of the first embodiment and the image display method of the second embodiment and use any of the image display methods as appropriate.

The three-dimensional model is not limited to that generated by using the group of captured images obtained by image capturing of the photographic subject and with the SfM technique and may be generated with any other method.

For example, a three-dimensional model of a photographic subject can be generated by obtaining three-dimensional information of the photographic subject from two parallax images captured with a twin-lens camera and using the obtained three-dimensional information. A three-dimensional model of a photographic subject can be generated by obtaining a captured image of the photographic subject with a time-of-flight camera and obtaining three-dimensional coordinates of the photographic subject corresponding to each pixel on the captured image. Further, a three-dimensional model of a construction can be generated on the basis of three-dimensional information of the construction obtained by a laser scanner that includes a camera function.

The hardware for implementing the image display apparatus according to the present invention can be configured as various processors. The various processors include a CPU (central processing unit), which is a general-purpose processor executing a program to function as various processing units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing. One processing unit that constitutes the image display apparatus may be configured as one of the various processors described above or two or more processors of the same type or different types. For example, one processing unit may be configured as a plurality of FPGAs or a combination of a CPU and an FPGA. Further, a plurality of processing units may be configured as one processor. As the first example of configuring a plurality of processing units as one processor, a form is possible where one or more CPUs and software are combined to configure one processor, and the processor functions as the plurality of processing units, a representative example of which is a computer, such as a client or a server. As the second example thereof, a form is possible where a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above. Further, the hardware configuration of the various processors is more specifically an electric circuit (circuitry) in which circuit elements, such as semiconductor elements, are combined.

Further, the present invention includes an image display program that is installed in a computer capable of accessing a storage unit storing a three-dimensional model of a photographic subject and a group of captured images obtained by image capturing of the photographic subject from different image capture positions and in different image capture directions relative to the photographic subject and that causes the computer to function as the image display apparatus according to the present invention, and a storage medium to which the image display program is recorded.

Further, the present invention is not limited to the above-described embodiments and various modifications can be made without departing from the spirit of the present invention as a matter of course.

REFERENCE SIGNS LIST 1 bridge
2 main girder
3 cross girder
4 sway bracing
5 lateral bracing
6 floor slab
7 pier
10 image display apparatus
12 image obtaining unit
16 storage unit
16A group of captured images
16B three-dimensional model
16C image list
18 operation unit
20 CPU
20A captured-image retrieving unit
20B captured-image determination unit
20C display switching unit
20D image list creation unit
20E positional information obtaining unit
20F condition setting unit
22 RAM
24 ROM
26 display control unit
30 display unit
30A screen
32 cursor
34 mark
36 scroll bar
100 captured image
100A mark
102 thumbnail
S10 to S150 step

What is claimed is:

1. An image display apparatus comprising:
  a storage that stores a three-dimensional model of a photographic subject and a group of captured images obtained by image capturing of the photographic subject from different image capture positions and in different image capture directions relative to the photographic subject; and
  a processor,
  wherein the storage stores a computer program that is configured with the processor to cause the image display apparatus to:
    in a case where the three-dimensional model stored in the storage is to be displayed on a display, accept a view operation for the three-dimensional model to be displayed on the display;
    read and display on the display the three-dimensional model stored in the storage and display the three-dimensional model on the basis of the view operation accepted by an operation interface;
    accept, in accordance with a user operation, positional information indicating a position on the three-dimensional model displayed on the display;
    identify a three-dimensional position on the three-dimensional model on the basis of the accepted positional information and retrieves a plurality of captured images each including a pixel corresponding to the identified three-dimensional position from the group of captured images stored in the storage;
    determine priority levels of the plurality of retrieved captured images on the basis of at least one condition among:
      a degree of facing of each captured image relative to the photographic subject;
      a distance of each captured image to the photographic subject; and
      an amount of shift between a position, on each captured image, corresponding to the identified three-dimensional position and a center position of the captured image; and
    display one or more of the plurality of retrieved captured images on the display in accordance with the determined priority levels.

2. The image display apparatus according to claim 1, wherein the computer program is configured with the processor to further cause the image display apparatus to determine the priority levels of the plurality of retrieved captured images, on the basis of at least one condition among:
  the degree of facing of each captured image relative to the photographic subject,
  the distance of each captured image to the photographic subject,
  the amount of shift between a position, on each captured image, corresponding to the identified three-dimensional position and the center position of the captured image, and
  a distinction of each captured image.

3. The image display apparatus according to claim 1, wherein
  the view operation is an operation for enlarging, reducing, translating, or rotating the three-dimensional model to be displayed on the display, and
  the computer program is configured with the processor to further cause the image display apparatus to enlarge, reduce, translate, or rotate the three-dimensional model to be displayed on the display on the basis of the view operation.

4. The image display apparatus according to claim 1, wherein the three-dimensional model is a three-dimensional model represented by:

a three-dimensional point cloud formed of three-dimensional information of a large number of points on a surface of the photographic subject, a three-dimensional model representing the surface of the photographic subject by an aggregate of polygons on the basis of the three-dimensional point cloud, or a three-dimensional model obtained by texture mapping in which captured images obtained by image capturing of the photographic subject are mapped to the polygons.

5. The image display apparatus according to claim 1, wherein the computer program is configured with the processor to further cause the image display apparatus to:
display the three-dimensional model in a first display region of the display, and
display the captured image or the captured images in a second display region of the display.

6. The image display apparatus according to claim 1, wherein the computer program is configured with the processor to further cause the image display apparatus to switch between display of the three-dimensional model on the display and display of the captured image or the captured images on the display.

7. The image display apparatus according to claim 1, wherein the computer program is configured with the processor to further cause the image display apparatus to:
display an image list indicating the group of captured images on the display;
accept an instruction for selecting any captured image from the image list in accordance with a user operation;
obtain positional information of a position on the three-dimensional model, the positional information corresponding to the captured image for which the instruction for selection is given; and
read and display on the display the three-dimensional model stored in the storage including, superimposed and displayed thereon, a mark indicating a position of the captured image for which the instruction for selection is given, on the three-dimensional model displayed on the display, on the basis of the positional information of the position on the three-dimensional model.

8. The image display apparatus according to claim 7, wherein the computer program is configured with the processor to further cause the image display apparatus to:
set a condition for narrowing down captured images to be extracted from the group of captured images and/or for sorting the group of captured images; and
create the image list indicating captured images obtained by narrowing down the group of captured images and/or the image list obtained by sorting the group of captured images, on the basis of the condition, wherein
the computer program is configured with the processor to further cause the image display apparatus to update the image list displayed on the display with the image list.

9. The image display apparatus according to claim 7, wherein an item displayed in the image list includes at least one of:
a minified image of each captured image in the group of captured images,
identification information for identifying each captured image,
the degree of facing of each captured image relative to the photographic subject,
the distance of each captured image to the photographic subject,
a distinction of each captured image,
information indicating whether each captured image is linked to an inspection record of the photographic subject, a damage detection result, or a repair record, or an image capture date and time.

10. The image display apparatus according to claim 7, wherein the computer program is configured with the processor to further cause the image display apparatus to:
display the three-dimensional model on which the mark is superimposed and displayed in a first display region of the display, and
read from the storage and displays in a second display region of the display, the captured image for which the instruction for selection is given.

11. The image display apparatus according to claim 7, wherein the computer program is configured with the processor to further cause the image display apparatus to enlarge, translate, or rotate the three-dimensional model to be displayed on the display, on the basis of the obtained positional information of the position on the three-dimensional model and allows the mark superimposed and displayed on the three-dimensional model to be easily visible.

12. An image display method comprising:
a step of storing a three-dimensional model of a photographic subject and a group of captured images obtained by image capturing of the photographic subject from different image capture positions and in different image capture directions relative to the photographic subject;
a step, in a case where the three-dimensional model stored in a storage is to be displayed on a display, of accepting a view operation for the three-dimensional model to be displayed on the display;
a first display step of reading and displaying on the display the three-dimensional model stored in the storage and displaying the three-dimensional model on the basis of the view operation accepted by an operation interface;
a step of accepting, in accordance with a user operation, positional information indicating a position on the three-dimensional model displayed on the display;
a step of identifying a three-dimensional position on the three-dimensional model on the basis of the accepted positional information and retrieving a plurality of captured images each including a pixel corresponding to the identified three-dimensional position from the group of captured images stored in the storage;
a step of determining priority levels of the plurality of retrieved captured images on the basis of at least one condition among:
a degree of facing of each captured image relative to the photographic subject;
a distance of each captured image to the photographic subject; and
an amount of shift between a position, on each captured image, corresponding to the identified three-dimensional position and a center position of the captured image; and
a second display step of displaying one or more of the plurality of retrieved captured images in accordance with the determined priority levels.

13. The image display method according to claim 12, wherein the step of determining the priority levels of the plurality of retrieved captured images, on the basis of at least one condition among:
the degree of facing of each captured image relative to the photographic subject, the distance of each captured image to the photographic subject, the amount of shift between a position, on each captured image, corresponding to the identified three-dimensional position and a center position of the captured image, and a distinction of each captured image.

14. The image display method according to claim 12, wherein
the view operation is an operation for enlarging, reducing, translating, or rotating the three-dimensional model to be displayed on the display, and
the first display step includes enlarging, reducing, translating, or rotating the three-dimensional model to be displayed on the display on the basis of the view operation.

15. The image display method according to claim 12, wherein the three-dimensional model is a three-dimensional model represented by:
a three-dimensional point cloud formed of three-dimensional information of a large number of points on a surface of the photographic subject,
a three-dimensional model representing the surface of the photographic subject by an aggregate of polygons on the basis of the three-dimensional point cloud, or
a three-dimensional model obtained by texture mapping in which captured images obtained by image capturing of the photographic subject are mapped to the polygons.

16. The image display method according to claim 12, wherein
the first display step includes displaying the three-dimensional model in a first display region of the display, and
the second display step includes displaying the captured image or the captured images in a second display region of the display.

17. The image display method according to claim 12, further comprising a step of switching between display of the three-dimensional model on the display in the first display step and display of the captured image or the captured images on the display in the second display step.

18. The image display method according to claim 12, further comprising:
a third display step of displaying an image list indicating the group of captured images on the display;
a step of accepting an instruction for selecting any captured image from the image list in accordance with a user operation;
a step of obtaining positional information of a position on the three-dimensional model, the positional information corresponding to the captured image for which the instruction for selection is given; and
a fourth display step of reading and displaying on the display the three-dimensional model stored in the storage, the fourth display step including superimposing and displaying a mark indicating a position of the captured image for which the instruction for selection is given, on the three-dimensional model displayed on the display, on the basis of the obtained positional information of the position on the three-dimensional model.

19. The image display method according to claim 18, further comprising:
a step of setting a condition for narrowing down captured images to be extracted from the group of captured images and/or for sorting the group of captured images; and a step of creating the image list indicating captured images obtained by narrowing down the group of captured images and/or the image list obtained by sorting the group of captured images, on the basis of the set condition, wherein
the third display step includes updating the image list displayed on the display with the created image list.

20. The image display method according to claim 18, wherein an item displayed in the image list includes at least one of:
a minified image of each captured image in the group of captured images,
identification information for identifying each captured image,
the degree of facing of each captured image relative to the photographic subject,
the distance of each captured image to the photographic subject,
a distinction of each captured image,
information indicating whether each captured image is linked to an inspection record of the photographic subject, a damage detection result, or a repair record, or
an image capture date and time.

21. The image display method according to claim 18, wherein the fourth display step includes displaying the three-dimensional model on which the mark is superimposed and displayed in a first display region of the display, and reading from the storage and displaying in a second display region of the display, the captured image for which the instruction for selection is given.

22. The image display method according to claim 18, wherein the fourth display step includes enlarging, translating, or rotating the three-dimensional model to be displayed on the display, on the basis of the obtained positional information of the position on the three-dimensional model and allowing the mark superimposed and displayed on the three-dimensional model to be easily visible.

23. A non-transitory computer-readable storage medium to which an image display program is recorded, the image display program to be installed in a computer capable of accessing a storage that stores a three-dimensional model of a photographic subject and a group of captured images obtained by image capturing of the photographic subject from different image capture positions and in different image capture directions relative to the photographic subject, the image display program causing the computer to implement:
a function of, in a case where the three-dimensional model stored in the storage is to be displayed on a display, accepting a view operation for the three-dimensional model;
a function of reading and displaying on the display the three-dimensional model stored in the storage and displaying the three-dimensional model on the basis of the view operation;
a function of accepting, in accordance with a user operation, positional information indicating a position on the three-dimensional model displayed on the display;
a function of identifying a three-dimensional position on the three-dimensional model on the basis of the accepted positional information and retrieving a plurality of captured images each including a pixel corresponding to the identified three-dimensional position from the group of captured images stored in the storage;
a function of determining priority levels of the plurality of retrieved captured images on the basis of at least one condition among:

a degree of facing of each captured image relative to the photographic subject;

a distance of each captured image to the photographic subject; and an amount of shift between a position, on each captured image, corresponding to the identified three-dimensional position and a center of the captured image; and a function of displaying one or more of the plurality of retrieved captured images on the display in accordance with the determined priority levels.

24. The storage medium according to claim 23, the image display program causing the computer to further implement:

a function of displaying an image list indicating the group of captured images on the display;

a function of accepting an instruction for selecting a captured image selected from the image list in accordance with a user operation;

a function of obtaining positional information of a position on the three-dimensional model, the positional information corresponding to the captured image for which the instruction for selection is given; and a function of reading and displaying on the display the three-dimensional model stored in the storage, the function including superimposing and displaying a mark indicating a position of the captured image for which the instruction for selection is given, on the three-dimensional model displayed on the display, on the basis of the obtained positional information of the position on the three-dimensional model.

* * * * *